US009818451B1

(12) United States Patent
Tyagi et al.

(10) Patent No.: US 9,818,451 B1
(45) Date of Patent: Nov. 14, 2017

(54) FRAME SELECTION OF VIDEO DATA

(71) Applicant: Amazon Technologies, Inc., Seattle, WA (US)

(72) Inventors: Ambrish Tyagi, Palo Alto, CA (US); Suresh Bholabhai Lakhani, Cupertino, CA (US); Rohith Mysore Vijaya Kumar, Sunnyvale, CA (US); Yadunandana Nagaraja Rao, Sunnyvale, CA (US); Amit Kumar Agrawal, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/976,844

(22) Filed: Dec. 21, 2015

(51) Int. Cl.
*H04N 9/70* (2006.01)
*G11B 27/34* (2006.01)
*G11B 27/30* (2006.01)
*G06K 9/00* (2006.01)

(52) U.S. Cl.
CPC .......... *G11B 27/34* (2013.01); *G06K 9/00744* (2013.01); *G06K 9/00758* (2013.01); *G11B 27/3081* (2013.01)

(58) Field of Classification Search
CPC ........ H04N 9/8042; H04N 5/781; H04N 5/85; H04N 9/7973; H04N 9/86

USPC ........................................................ 386/300
See application file for complete search history.

(56) References Cited

U.S. PATENT DOCUMENTS

2009/0092375 A1\* 4/2009 Berry .................... H04N 5/147
386/248

\* cited by examiner

*Primary Examiner* — William C Vaughn, Jr.
*Assistant Examiner* — Daniel Tekle
(74) *Attorney, Agent, or Firm* — Pierce Atwood LLP

(57) ABSTRACT

A system and method for selecting portions of video data from preview video data is provided. The system may extract image features from the preview video data and discard video frames associated with poor image quality based on the image features. The system may determine similarity scores between individual video frames and corresponding transition costs and may identify transition points in the preview video data based on the similarity scores and/or transition costs. The system may select portions of the video data for further processing based on the transition points and the image features. By selecting portions of the video data, the system may reduce a bandwidth consumption, processing burden and/or latency associated with uploading the video data or performing further processing.

20 Claims, 19 Drawing Sheets

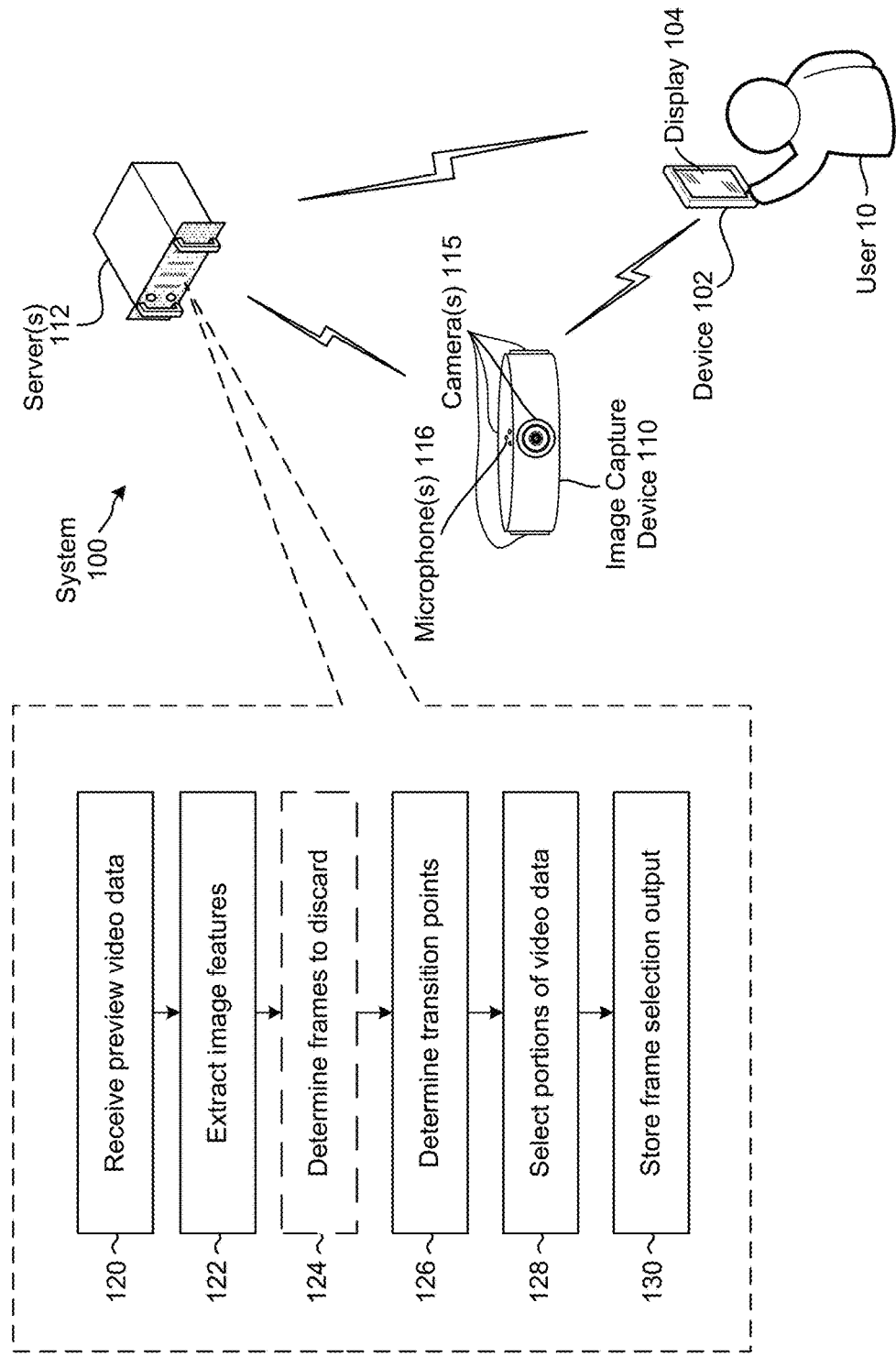

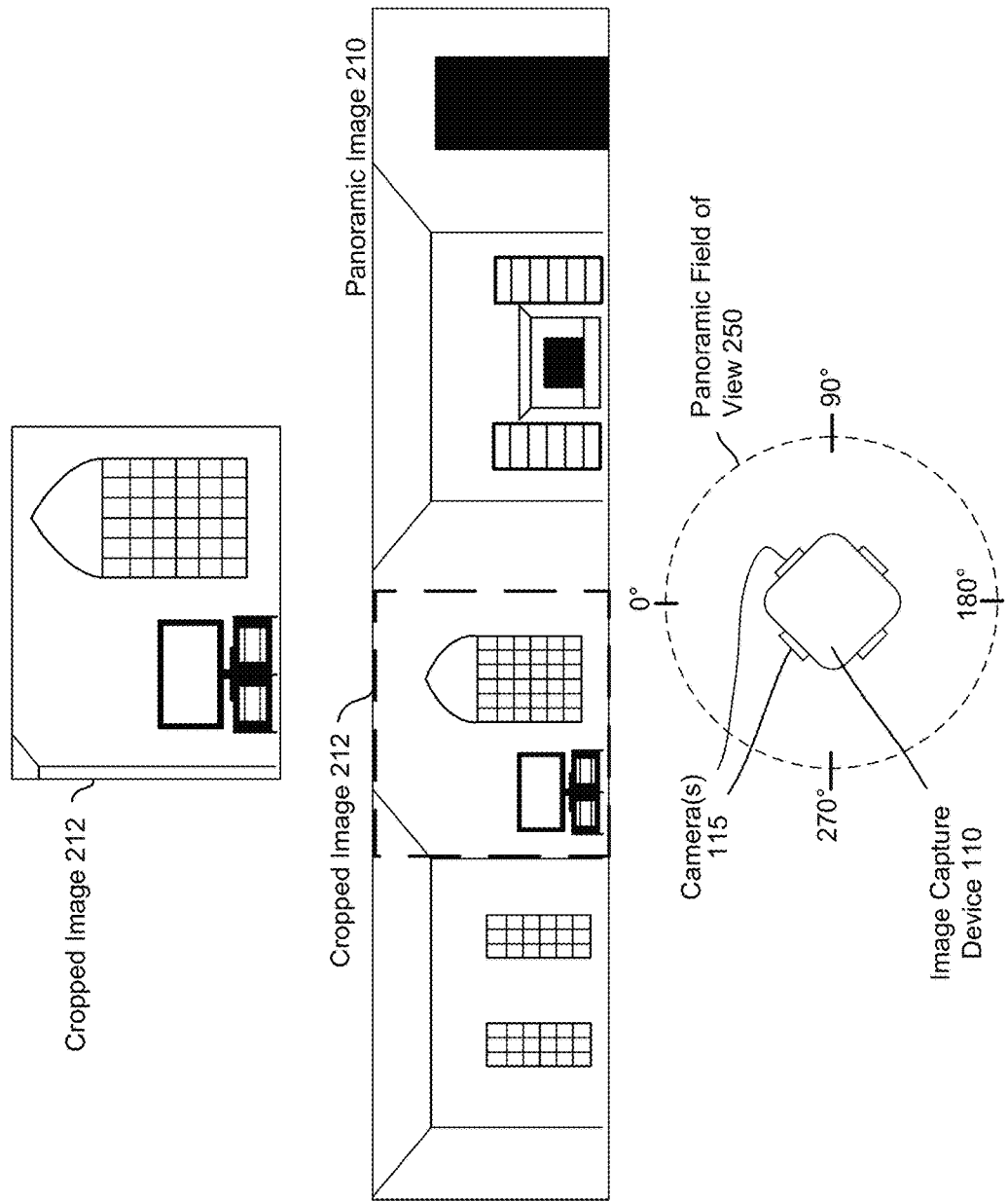

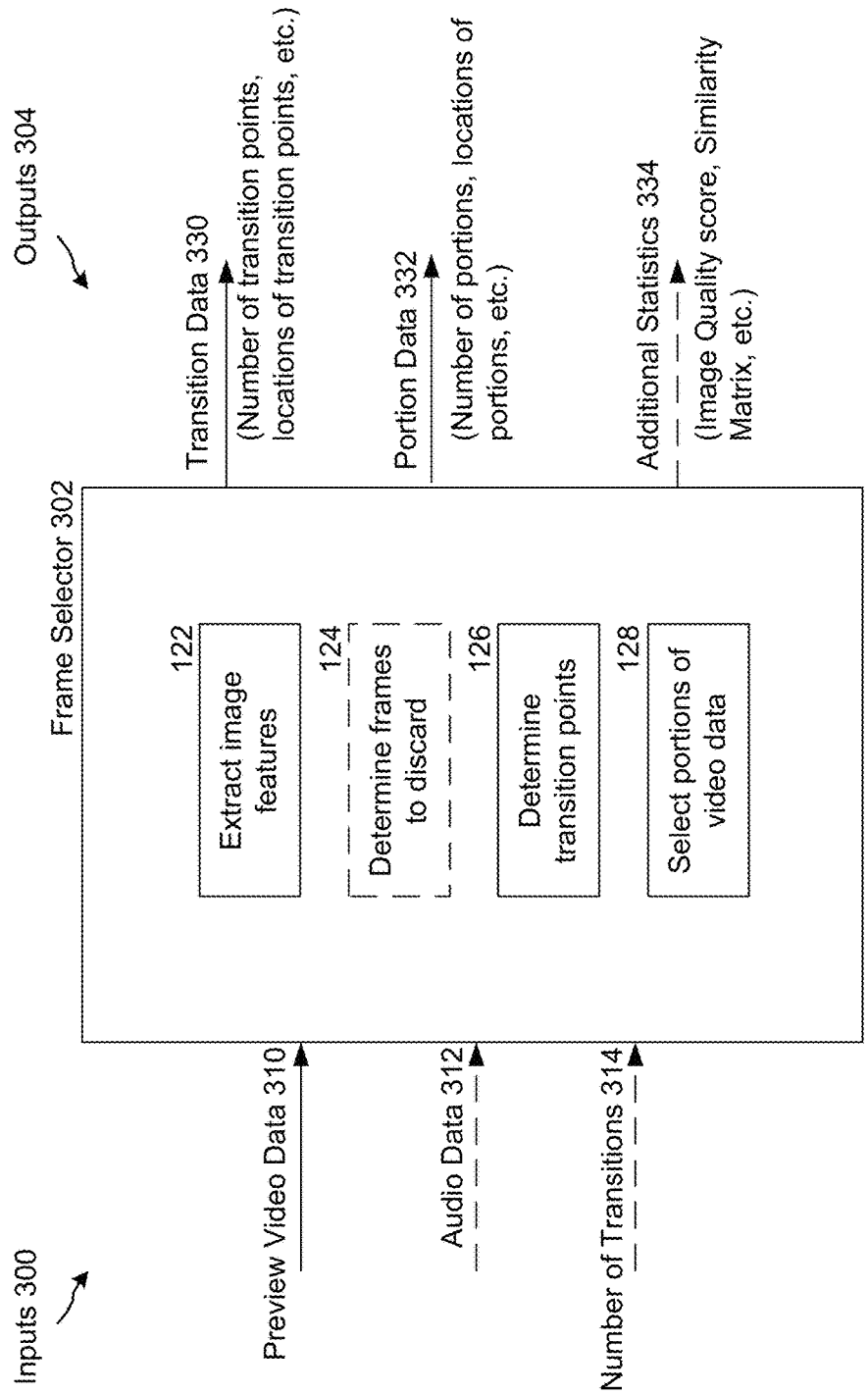

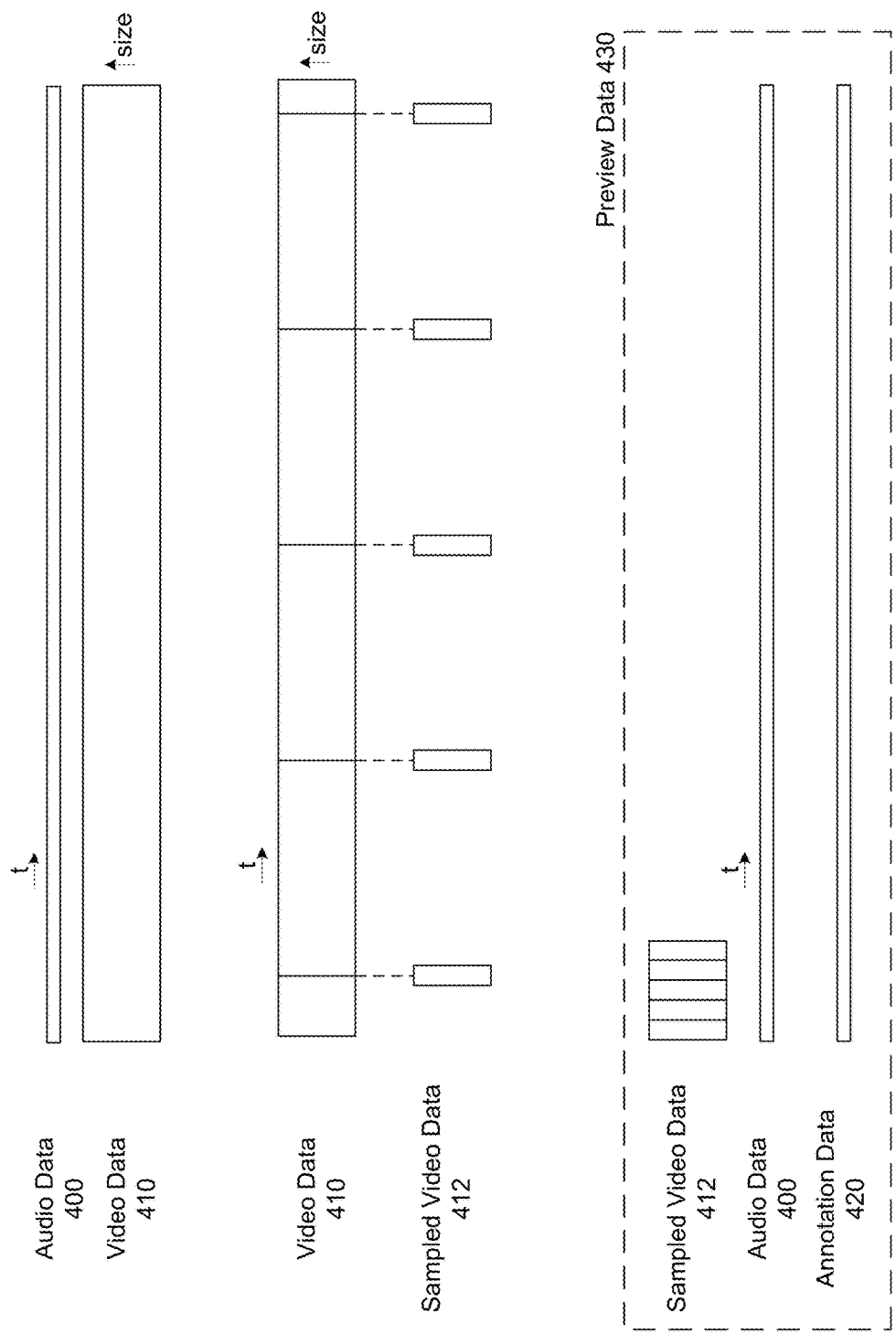

FIG. 5
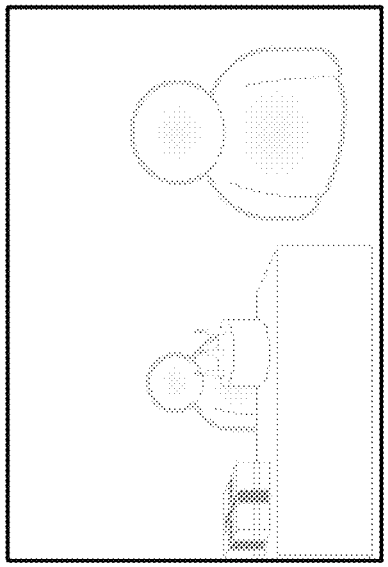
Over-exposed Image 512
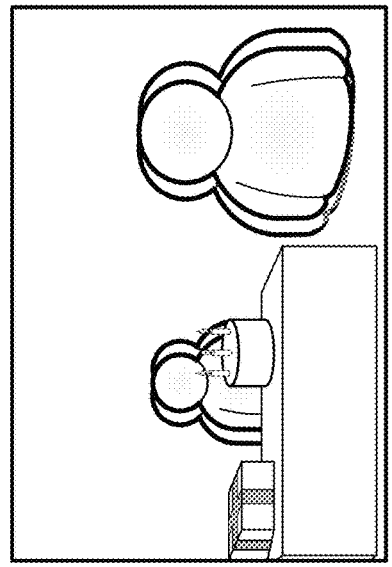
Motion Blur Image 516
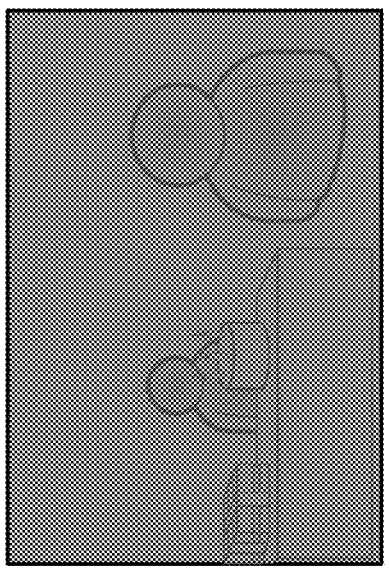
Under-exposed Image 510
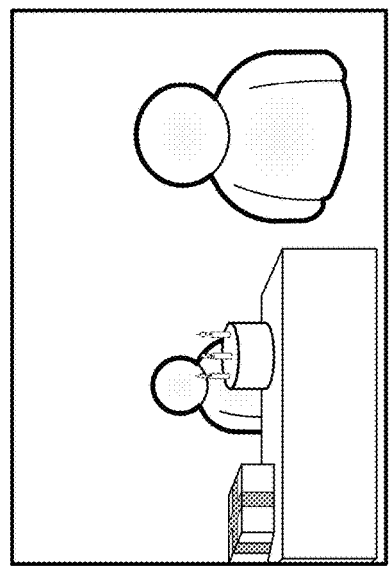
Out of Focus Image 514

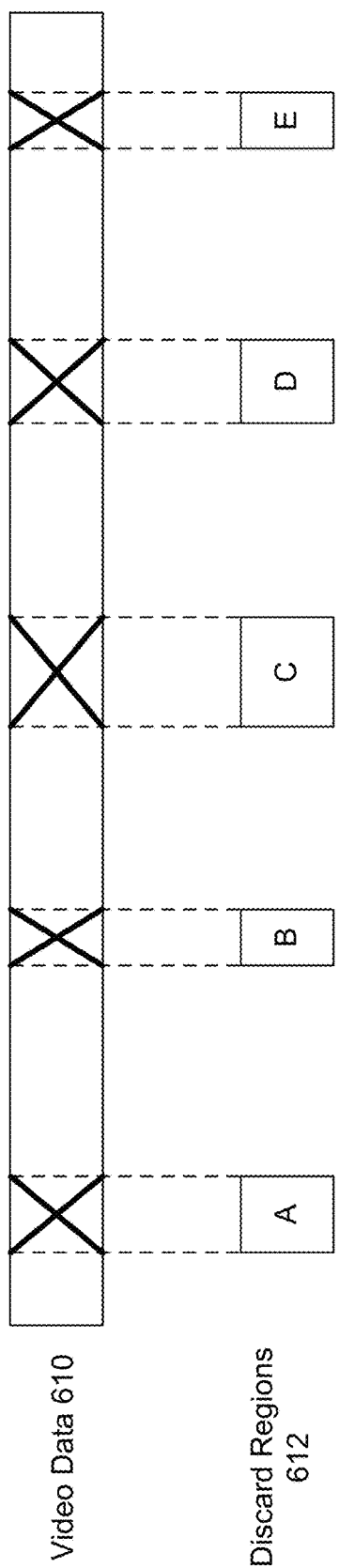

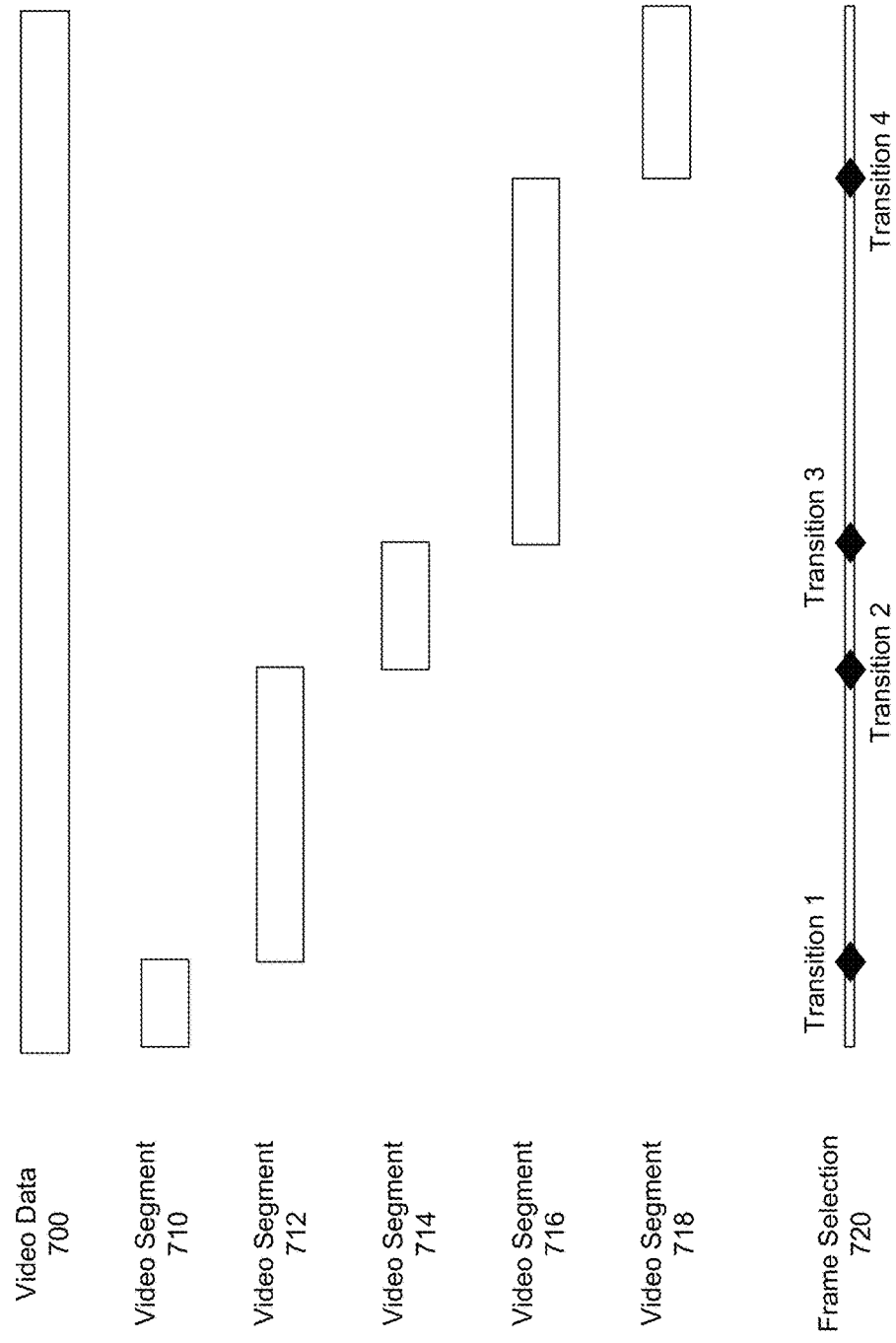

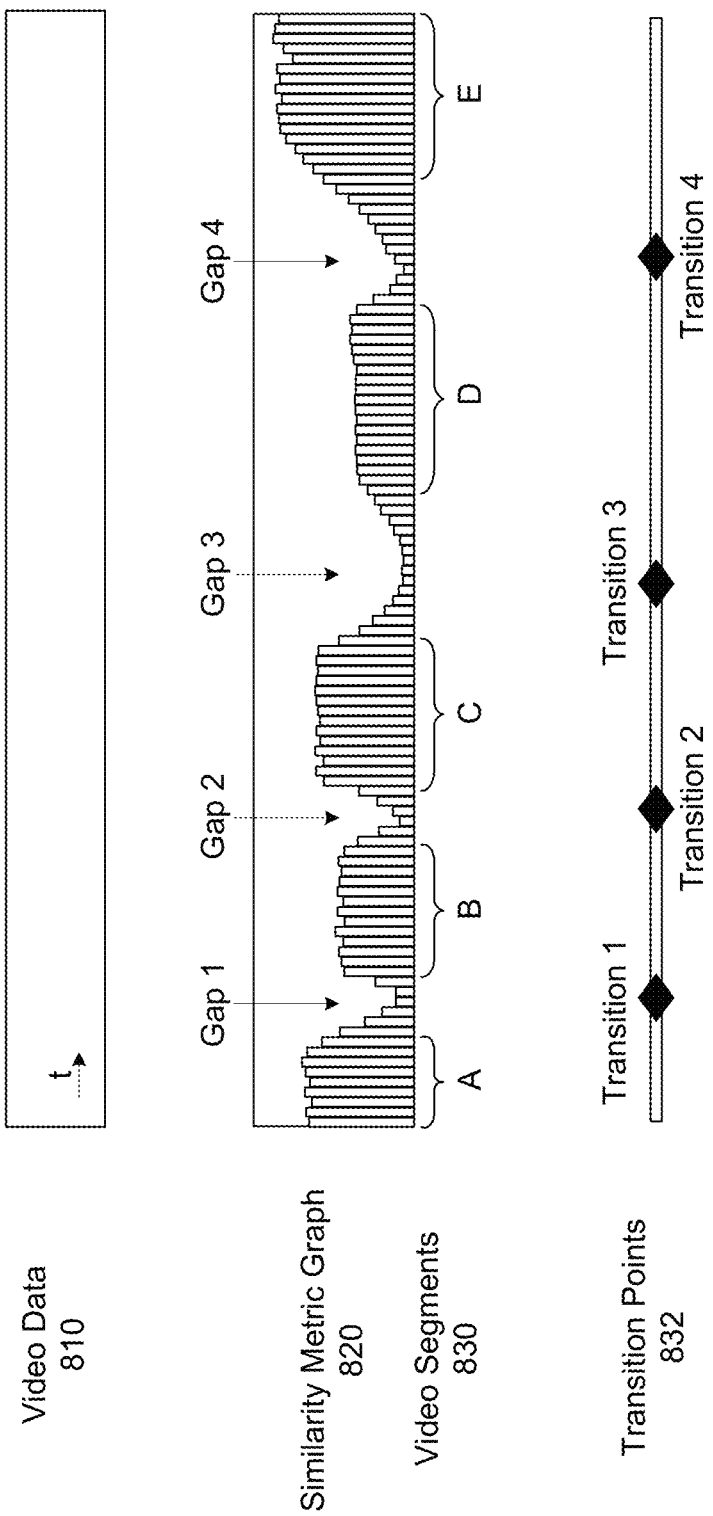

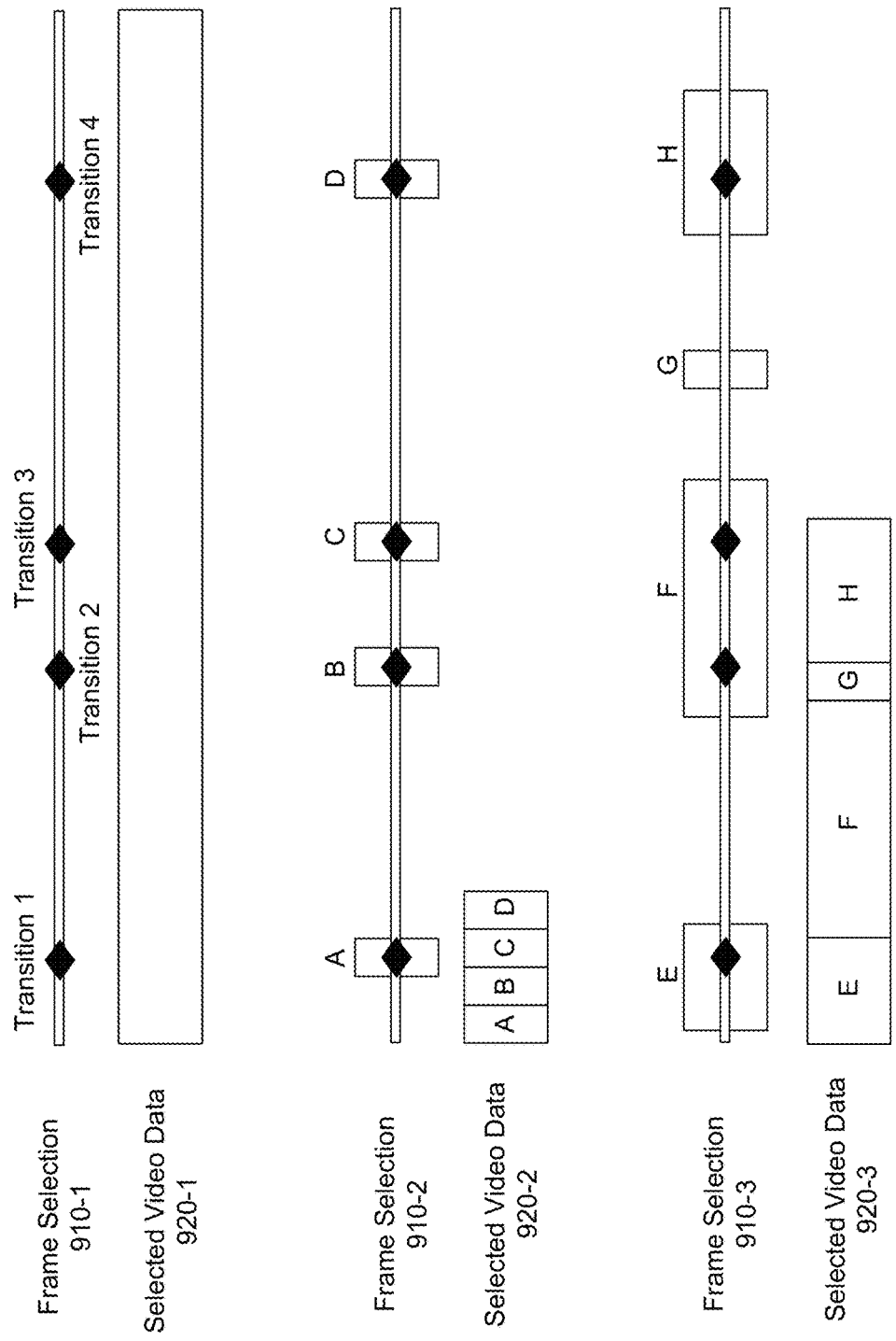

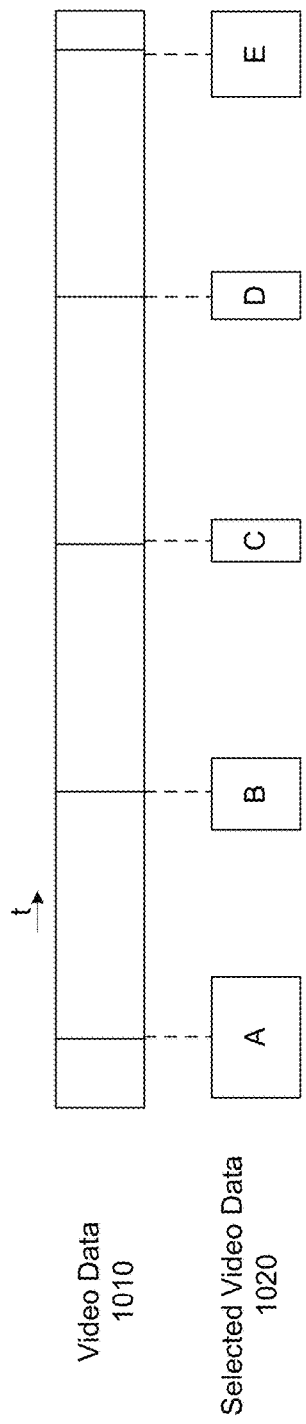
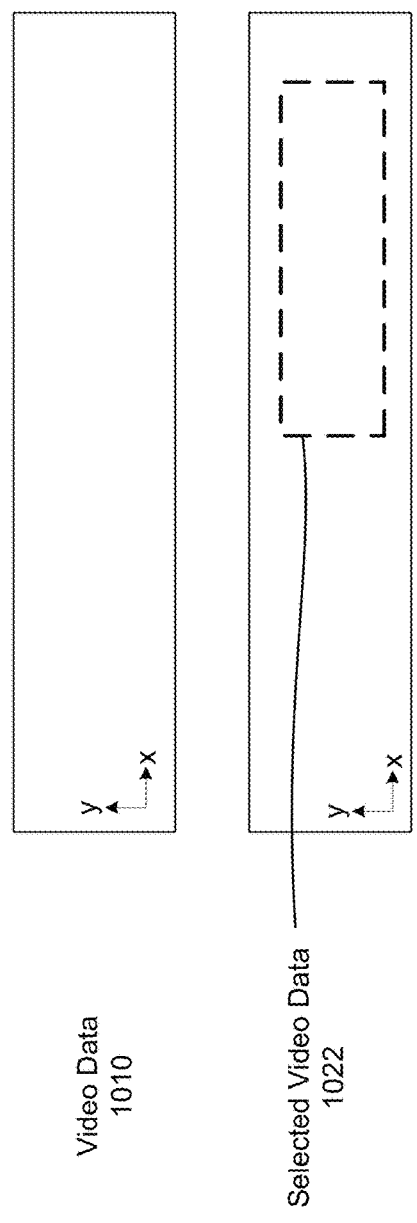

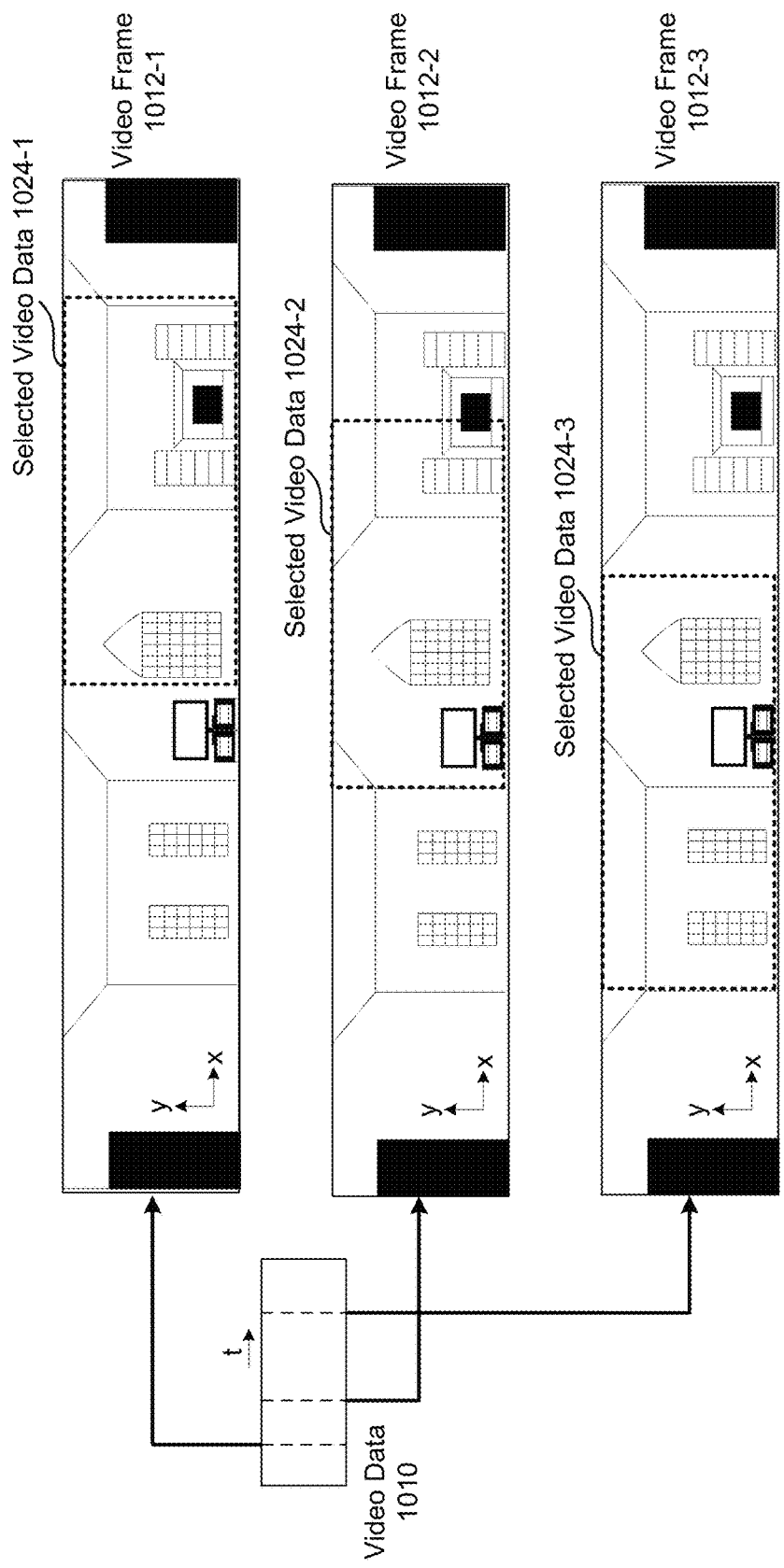

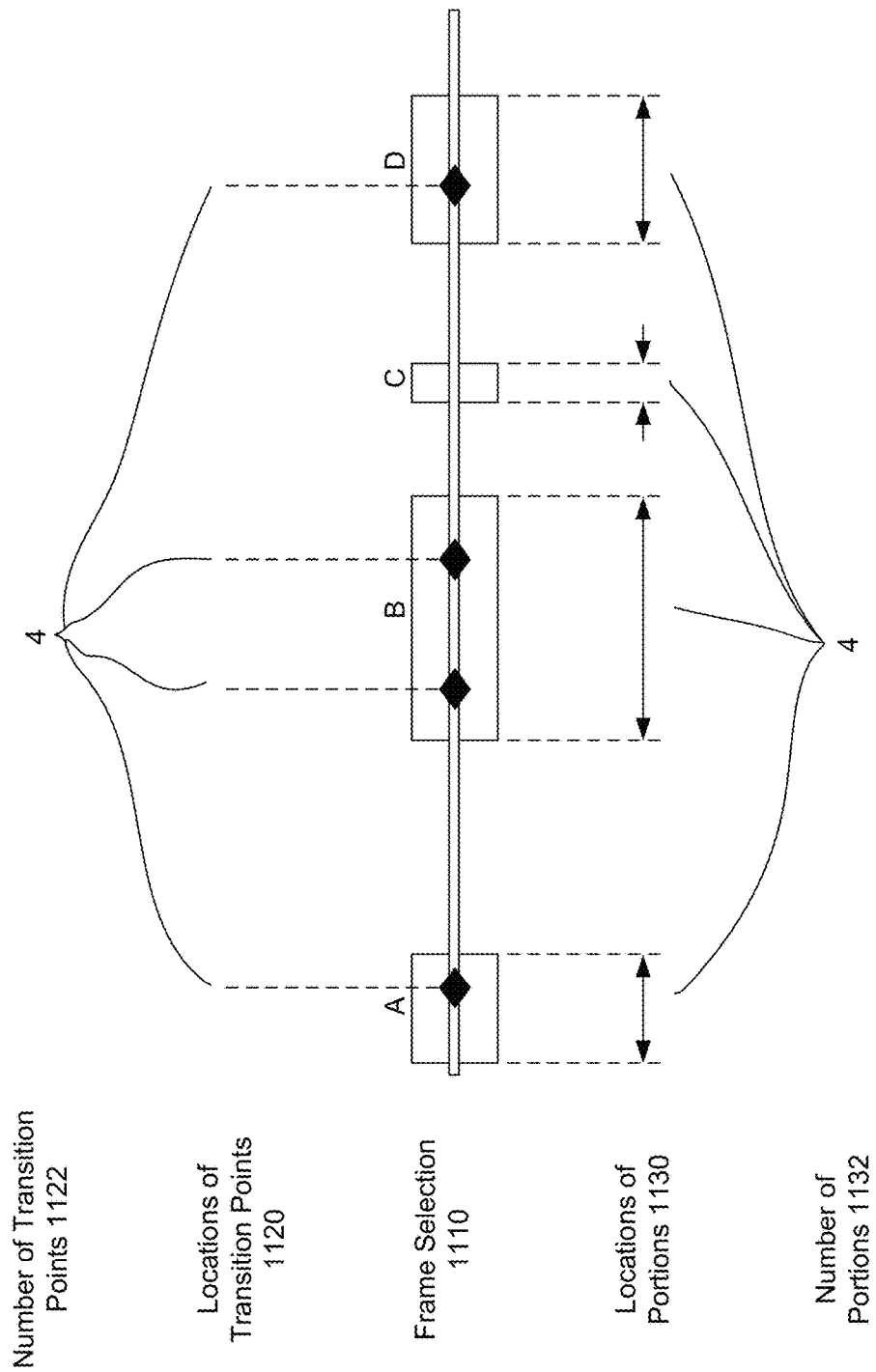

FRAME SELECTION OF VIDEO DATA

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIG. 1 illustrate overviews of systems for implementing embodiments of the present disclosure.

FIGS. 2A-2B illustrate examples of cropping video data in time and space according to embodiments of the present disclosure.

FIG. 3 illustrates an example of a frame selector according to embodiments of the present disclosure.

FIG. 4 illustrates an example of preview data according to embodiments of the present disclosure.

FIG. 5 illustrates examples of poor image quality.

FIG. 6 illustrates an example of discarding regions of video data corresponding to poor image quality according to embodiments of the present disclosure.

FIG. 7 illustrates an example of determining video segments and generating a frame selection according to embodiments of the present disclosure.

FIGS. 8A-8B illustrate examples of determining transition points between video segments according to embodiments of the present disclosure.

FIG. 9 illustrates examples of selecting portions of video data according to embodiments of the present disclosure.

FIGS. 10A-10C illustrate examples of selecting portions of video data in time and/or space according to embodiments of the present disclosure.

FIG. 11 illustrates a frame selection output according to embodiments of the present disclosure.

DETAILED DESCRIPTION

Figure 2B:
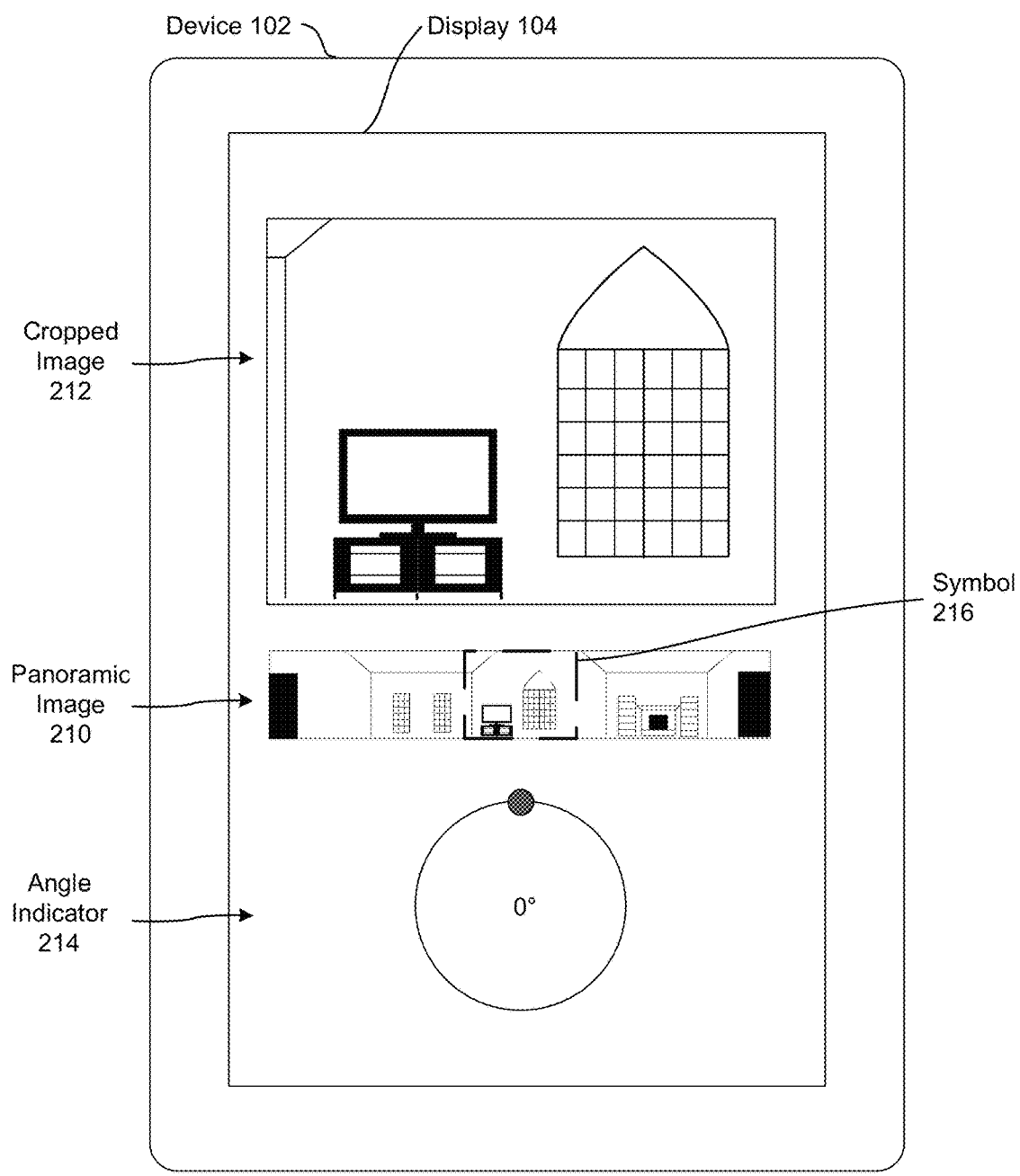

Electronic devices are commonly used to capture video data. The devices may capture video data over a lengthy period of time and some devices may capture a wide field of view in order to capture video showing a wide area. Given the amount of captured video, certain devices may upload video data to a remote server with greater processing/storage resources for purposes of editing, storage, etc. Uploading all captured video data to a server, however, may consume bandwidth and require a lengthy period of upload time to complete. As additional processing may be performed on the video data after being uploaded, performing the additional processing on all captured video data may increase a processing burden and require a lengthy period of processing time to complete. The upload time and the processing time may increase a delay or latency between when the video data is first uploaded and when the additional processing is completed.

To reduce such bandwidth consumption, processing burden and/or latency, devices, systems and methods are disclosed that select portions of captured video data to upload and/or perform additional processing (e.g., annotation). For example, a video capture device may capture video data and generate sampled video data from the captured video data, and a remote device may receive the sampled video data and select portions of the sampled video data. As an example, using the sampled video data the remote device may select portions of the captured video to upload and/or perform additional processing on, reducing a bandwidth consumption and/or upload time otherwise associated with uploading/processing the captured video data in its entirety.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the server(s) 112 may receive (120) preview video data. The preview video data may be sampled from raw video data. The image capture device 110 may capture the raw video data at a first sampling frequency (e.g., 30 frames per second) and may generate preview video data at a second sampling frequency (e.g., 1 frame per second). Thus, the preview video data covering a certain elapsed time period may have fewer frames than the raw video data covering the same elapsed time period and may therefore be uploaded using fewer processing resources and/or bandwidth than uploading the raw video data in its entirety. In some examples, the raw video data may be captured by the image capture device 110 and may be panoramic video data having a field of view beyond 180 degrees, which corresponds to video data with an aspect ratio greater than 2:1. However, the present disclosure is not limited thereto and the raw video data may have any field of view/aspect ratio and/or may be captured by other devices.

The server(s) 112 may extract (122) image features from the preview video data, such as color histograms or the like. The server(s) 112 may optionally determine (124) video frames to discard, the video frames associated with poor image quality (IQ) scores determined using the image features. However, the present disclosure is not limited thereto. The server(s) 112 may determine (126) transition points in the preview video data based on the image features. For example, the server(s) 112 may determine similarity scores between pairs of video frames, the similarity scores indicating a similarity between the pair of video frames. For example, the server(s) 112 may determine a first similarity score between a first video frame and a second video frame and determine a second similarity score between the first video frame and a third video frame. The server(s) 112 may determine the similarity scores using the image features (e.g., color histograms) extracted from the preview video data, spatial correlation, normalized cross-correlation (NCC) and/or motion vectors across the video frames or the like. The similarity scores may be a numerical value between zero and one, with a similarity score of zero indicating completely different video frames and a similarity score of one indicating identical video frames.

The server(s) 112 may select (128) portions of the video data and may store (130) a frame selection output. For example, the server(s) 112 may select portions of the video data based on the image features and the transition points, the frame selection output indicating the selected portions of the video data and the transition points. In some examples, the server(s) 112 may annotate the selected portions of the video data, reducing a processing burden on the server(s) 112 relative to annotating an entirety of the video data. In other examples, the server(s) 112 may send a request to the image capture device 110 to upload only the selected portions of the video data, reducing a bandwidth consumption and/or processing burden on the image capture device 110 and/or the server(s) 112 relative to uploading an entirety of the video data.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the server(s) 112 may extract individual video clips included in the video data based on priority metrics and the annotation data. For example, the server(s) 112 may determine a priority metric (e.g., interesting score) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including annotation information that may be used in video summarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The image capture device 110 and/or the server(s) 112 may generate annotation data that may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

The server(s) 112 may generate additional annotation data. For example, the server(s) 112 may generate emotional data, which may include emotional detection (e.g., determining a mood such as happy, sad, excited, etc.) for an individual, a group of people, the video frame or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

The server(s) 112 may render the video (e.g., generate the video summarization) using rendering information included in the generated video tags. For example, the rendering information may indicate an order of the selected video clips, the begin point and end point associated with the individual video clips, the selected theme, the selected panning for the individual video clip(s), the special effects, the audio data and/or other editing steps. As a first example, a first video tag may indicate the order of the selected video clips, a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clip or a group of video clip without departing from the disclosure.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

As part of generating the video summarization, the device 102 may display output video data and may request input from a user 10 of the device 102. For example, the user 10 may instruct the device 102 to generate additional video data (e.g., create an additional video summarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

FIG. 3 illustrates an example of a frame selector according to embodiments of the present disclosure. As illustrated in FIG. 3, inputs 300 may be input to a rule engine 302 and the rule engine 302 may generate outputs 304.

The inputs 300 may include preview video data 310, audio data 312 and a number of transitions 314, although the audio data 312 and the number of transitions 314 are optional. However, the disclosure is not limited thereto and the inputs 300 may include additional inputs not illustrated in FIG. 3, such as annotation data. The preview video data 310 may have a first sampling rate (e.g., 1 frame per second) and may correspond to video data having a second sampling rate (e.g., 30 frames per second). The preview video data 310 may include a plurality of video clips or other video data, which may include an aspect ratio greater than 2:1.

As illustrated in FIG. 3, the frame selector 302 may perform steps 122-128, which are discussed in greater detail above with regard to FIG. 1, to select portions of the preview video data 310 and corresponding video data. The frame selector 302 may optionally extract audio features from the audio data 312 and determine audio transition points and/or an audio selection output based on the audio features. For example, the audio data 312 may include dramatic transitions that the frame selector 302 may use to determine transition points in the preview video data 310. To detect the dramatic transitions, the frame selector 302 may detect audio cues such as a particular noise, clapping, laughter, the existence of speech or the like and may determine transitions in the audio data 312 using the audio cues. For example, the frame selector 302 may determine that continuous conversation ends at a first point or that applause occurs at a second point and may associate the first point and the second point with audio transition points.

As will be discussed below, the number of transitions 314 may optionally be input to the frame selector 302 and the frame selector 302 may determine the transition points (e.g., locations) based on the number of transitions. Thus, the frame selector 302 may limit the number of transition points and identify optimum locations for each of the transition points. If the number of transitions 314 is not input to the frame selector 302, the frame selector 302 may determine a number of transitions using an average time per transition point stored in the frame selector 302. For example, the frame selector 302 may determine a duration of the preview video data 310 and divide the duration by the average time per transition point to determine the number of transitions.

The outputs 304 of the frame selector 302 may include transition data 330, portion data 332 and optionally additional statistics 334. The transition data 330 may identify a number of transition points, locations associated with the transition points (e.g., a particular video frame) or other data associated with the transition points determined by the frame selector 302. The portion data 332 may indicate a number of portions, locations associated with the portions (e.g., a starting video frame and an ending video frame) or other data associated with the portions of the sampled video data determined by the frame selector 302. The additional statistics 334 may indicate an image quality score associated with individual video frames, a similarity matrix or other statistics and/or data determined by the frame selector 302.

The outputs 304 may be used to select a portion of video data to upload from the image capture device 110 to the server(s) 112 and/or to process by the server(s) 112. For example, instead of uploading an entirety of video data, the server(s) 112 may select portions of the video data to upload and the image capture device 110 may upload only the selected portions to reduce a bandwidth consumption and/or processing burden associated with uploading the video data. Additionally or alternatively, the image capture device 110 may upload an entirety of the video data and the server(s) 112 may annotate only the selected portions to reduce a processing burden on the server(s) 112.

FIG. 4 illustrates an example of preview data according to embodiments of the present disclosure. Typically, an image capture device 110 captures audio data 400 and video data 410 and uploads the audio data 400 and the video data 410 (and in some examples additional data, such as annotation data including video tags) to the server(s) 112. As illustrated in FIG. 4, the video data 410 is relatively large, which is illustrated by the video data 410 having a greater height than the audio data 400 (e.g., the x dimension corresponds to a length of time and the y dimension corresponds to a size of the data per second). Therefore, uploading the video data 410 in its entirety consumes a relatively large amount of bandwidth, memory and/or processing power of the image capture device 110 and/or the server(s) 112.

To generate the preview data 430, the image capture device 110 may sample the video data 410 at a fixed sampling frequency to generate sampled video data 412. For example, the video data 410 may have a first sampling frequency (e.g., 30 video frames per second) and the sampled video data may have a second sampling frequency (e.g., 1 video frame per second). Thus, the sampled video data 412 may be relatively small (e.g., 30 times smaller than the video data 410) and uploading the sampled video data 412 consumes a relatively small amount of bandwidth, memory and/or processing power of the image capture device 110 and/or the server(s) 112 compared to the video data 410. The preview data 430 may include the sampled video data 412, the audio data 400 and/or annotation data 420 and the image capture device 110 may upload the preview data 430 to the server(s) 112.

In some examples, the image capture device 110 may generate the annotation data 420 using the preview data 430 prior to uploading the preview data 430. For example, the image capture device 110 may perform computer vision processing on the sampled video data 412 to identify transitions, faces/people/objects represented in the sample video data 412 or the like. Due to hardware limitations of the image capture device 110 relative to the server(s) 112, the annotation data 420 generated by the image capture device 110 may be limited compared to annotation data generated by the server(s) 112, although the disclosure is not limited thereto. In other examples, the image capture device 110 may generate the annotation data 420 using the preview data 430 and may not upload the preview data 430. In a first example, the image capture device 110 may generate the annotation data 420 and upload the annotation data 420 instead of the sampled video data 412. In a second example, the image capture device 110 may identify transitions in the sampled video data 412 and may upload portions of the video data 410 corresponding to the identified transitions.

The annotation data 420 may indicate significant changes to a scene, such as whether the image capture device 110 has moved (e.g., indoor scene, outdoor scene or the like), whether a number of people in a room has increased/decreased, if a person/object was located near the image capture device 110 for a period of time, if music/speech began, or the like. The annotation data 420 may include inertial measurement unit (IMU) data indicating if the image capture device 110 is moving, static, handheld, etc. Additionally or alternatively, the annotation data 420 may include video tags input by a user 10. In a first example, the video tags may be input using buttons on the image capture device 110. In a second example, the video tags may be input using a companion application running on a device 102 operated by the user 10. The video tags may identify moments of interest in the video data 410 that may be included in the video summarization. While FIG. 4 illustrates the annotation data 420 corresponding to an entirety of the video data 410, the disclosure is not limited thereto. Instead, the annotation data 420 may correspond to portions of the video data 410 and may include gaps between the portions of the video data 410. Similarly, while the annotation data 420 is illustrated as having a constant size over the duration of the video data 410, the disclosure is not limited thereto and a size of the annotation data 420 may vary. Additionally or alternatively, the annotation data 420 may be illustrated as a block of data of variable size that does not correspond to a timeline.

In some examples, the preview data 430 may include the audio data 400 as captured by the image capture device 110. Additionally or alternatively, the preview data 430 may include characteristic data indicating characteristics of the audio data, such as elementary signals of the audio data, an indication if speech is present, if music is present or the like.

The second sampling frequency may be fixed (e.g., 1 frame per second, although the disclosure is not limited thereto) or may vary based on the video data 410. For example, the image capture device 110 may perform computer vision processing on the video data 410 and/or the sampled video data 412 a first time to identify first portions of the video data 410 including static images (e.g., redundant video frames, very few moments of activity/motion) and second portions of the video data 410 including dynamic images (e.g., activity/motion, multiple faces/people or the like). The image capture device 110 may then sample the video data 410 dynamically, using a relatively lower sampling frequency (e.g., 1 frame per second) for the first portions and a relatively higher sampling frequency (e.g., 5 frames per second) for the second portions. Thus, the sampling rate of the sampled video data 412 may vary based on a complexity of the video data 410.

In some examples, the image capture device 110 may generate the sampled video data 412 while the image capture device 110 captures the video data 410. For example, the image capture device 110 may stitch panoramic images to generate the video data 410 and may extract the sampled video data 412 at a lower sampling rate based on the second sampling frequency. However, the disclosure is not limited thereto and the image capture device 110 may generate the sampled video data 412 after capturing the video data 410 without departing from the present disclosure. Additionally or alternatively, the sampled video data 412 may be a lower resolution than the video data 410. For example, the video data 410 may have a first resolution and the sampled video data 412 may have a second resolution that is lower than the first resolution, resulting in a reduced size of the sample video data per second (e.g., the sampled video data 412 has a reduced height in the y direction relative to the video data 410).

The server(s) 112 may perform image quality analysis on the sampled video data to determine an image quality score associated with individual video frames in the sampled video data. When the image quality is poor (e.g., the image quality score is below a threshold), the server(s) 112 may discard the associated video frame. FIG. 5 illustrates examples of poor image quality.

As illustrated in FIG. 5, an under-exposed image 510 may have poor image quality as there is not enough exposure (e.g., pixel values are too low) and the resulting image is dark. The server(s) 112 may detect the under-exposed image 510 using several techniques, for example by using a color histogram (e.g., the color histogram may indicate that dim pixel values are clipped) or by seeing how much extra gain can be applied to the under-exposed image 510 without causing a number of saturated pixels to exceed a threshold.

In contrast to the under-exposed image 510, an over-exposed image 512 may have poor image quality as there is too much exposure (e.g., pixel values are too high) and the resulting image is bright. The server(s) 112 may detect the over-exposed image 512 using several techniques, for example by using a color histogram (e.g., the color histogram may indicate that bright pixel values are clipped) or by identifying a narrow, tall peak anywhere in bins [216-255] of the 256-bin Y-histogram.

Another example of poor image quality is an out of focus image 514. For example, the out of focus image 514 may be focused on an object in the background and the subject (e.g., the people and the birthday cake represented in the out of focus image 514) may be out of focus. Another example of focusing issues is motion blur image 516, which includes motion blur associated with each of the people represented in the motion blur image 516. The motion blur may be caused by subject movement (e.g., image capture device 110 is stationary but the subject moved) or by camera movement (e.g., image capture device 110 is moving). The out of focus image 514 and the motion blur image 516 may be determined using techniques known to one of skill in the art. While FIG. 5 illustrates four examples of images with poor image quality, the disclosure is not limited thereto.

FIG. 6 illustrates an example of discarding regions of video data corresponding to poor image quality according to embodiments of the present disclosure. As illustrated in FIG. 6, the server(s) 112 may perform image quality analysis on video data 610 and may determine that portions of the video data 610 have poor image quality. For example, the server(s) 112 may determine discard regions 612, including regions A-E. Regions A-E may correspond to poor image quality such as underexposure, overexposure, out of focus areas, motion blur, low color histogram entropy or the like. Thus, the server(s) 112 may perform first processing to determine the discard regions 612 using low level image features (e.g., color histogram, spatial correlation, normalized cross correlation (NCC), motion vectors or the like) and may perform second processing on the remaining video frames in the video data 610.

For example, the server(s) 112 may perform additional processing on the remaining video frames that are not included in the discard regions 612 to determine video segments and/or transition points. FIG. 7 illustrates an example of determining video segments and generating a frame selection according to embodiments of the present disclosure. For example, the server(s) 112 may determine image features associated with individual video frames of video data 600, may determine similarity scores between the individual video frames using the image features and may separate the video data 600 into the discrete segments based on the similarity scores.

As illustrated in FIG. 7, the server(s) 112 may determine a first video segment 710, a second video segment 712, a third video segment 714, a fourth video segment 716 and a fifth video segment 718. For example, first video frames in the first video segment 710 may be similar (e.g., similarity scores within a first range) and second video frames in the second video segment 712 may be similar (e.g., similarity scores within a second range), but the first video frames may be different than the second video frames (e.g., difference between the first range and the second range exceeds a threshold). Similarly, third video frames in the third video segment 714 may be similar (e.g., similarity scores within a third range), but the second video frames may be different than the third video frames (e.g., difference between the second range and the third range exceeds the threshold). Based on the discrete video segments 710-718, the server(s) 112 may determine transition points (e.g., Transition 1, Transition 2, Transition 3 and Transition 4) and may generate frame selection 720.

Figure 8B:
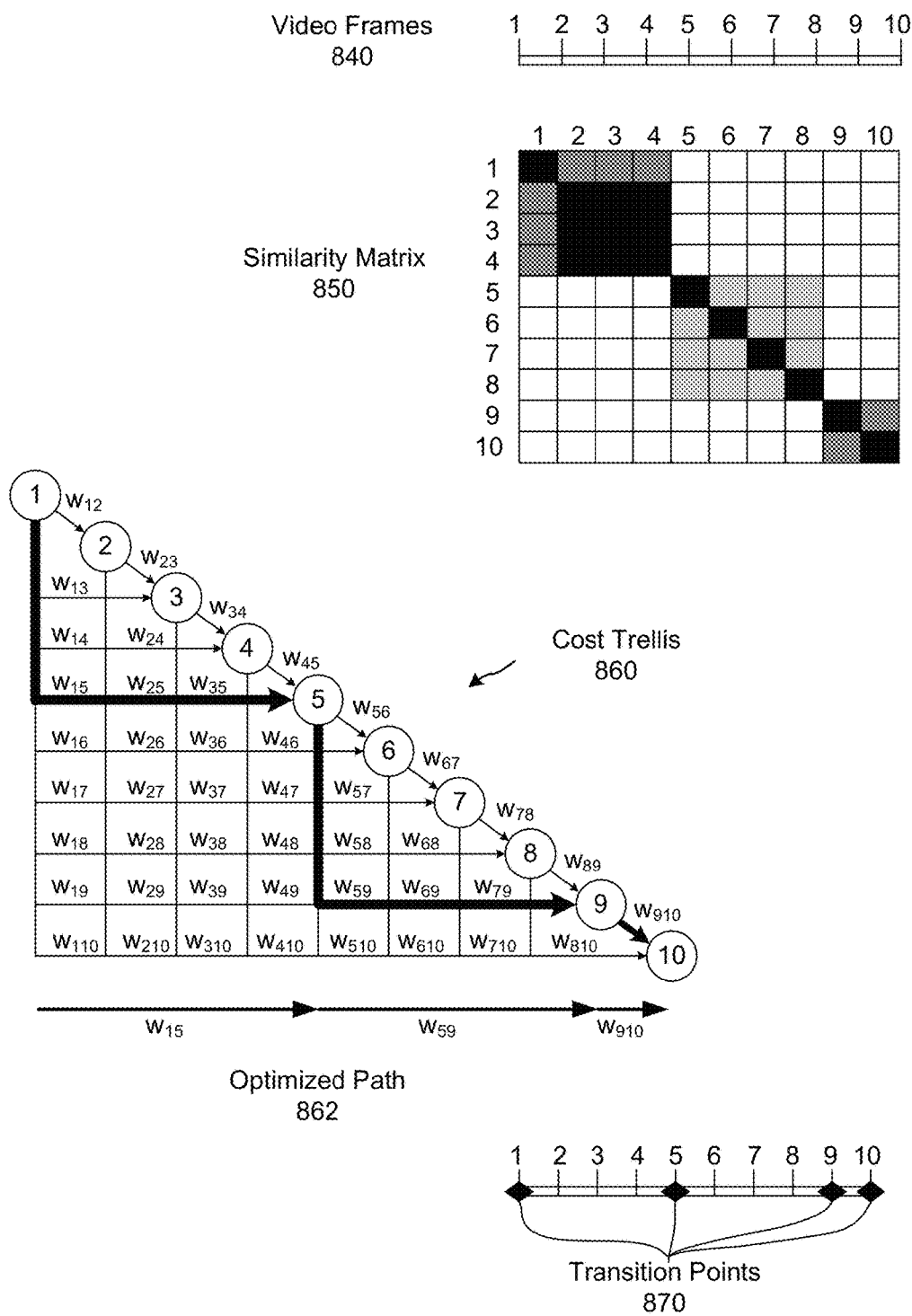

In some examples, there may be transitions between the video segments and the server(s) 112 may determine transition points associated with the transitions. FIG. 8A-8B illustrate examples of determining transition points between video segments according to embodiments of the present disclosure. As illustrated in FIG. 8A, the server(s) 112 may determine image features associated with individual video frames of video data 810, may determine similarity scores between the individual video frames using the image features and may generate a similarity metric graph 820 using the similarity scores associated with individual video frames. The server(s) 112 may determine similarity scores within a threshold of each other and may identify video segments having similarity scores within a range. For example, the server(s) 112 may identify video segments 830 (e.g., video segment A, video segment B, video segment C, video segment D and video segment E) separated by gaps 1-4. The gaps 1-4 may correspond to similarity scores below a threshold and/or below the respective ranges of the video segments 830.

As illustrated in FIG. 8A, first video frames in video segment A may be similar (e.g., similarity scores within a first range) and second video frames in video segment B may be similar (e.g., similarity scores within a second range), but the first video frames may be different than the second video frames (e.g., difference between the first range and the second range exceeds a threshold). Similarly, third video frames in video segment C may be similar (e.g., similarity scores within a third range), but the second video frames may be different than the third video frames (e.g., difference between the second range and the third range exceeds the threshold). Based on the video segments 830, the server(s) 112 may determine transition points 832 (e.g., Transition 1, Transition 2, Transition 3 and Transition 4) in the gaps 1-4.

The server(s) 112 may determine locations associated with the transition points 832 using a cost function. For example, the server(s) 112 may define a cost function indicating a cost associated with each of the similarity scores and may perform global cost optimization using dynamic programming to minimize the cost. Thus, the server(s) 112 may determine a sum of transition costs at any point by adding a new transition cost to an overall transition cost and may minimize the overall cost. The server(s) 112 may define the cost function based on similarity scores from typical videos based on the image features or other data associated with the video data. For example, if the image capture device 110 is stationary while capturing the video data and the video segments include similar frames, similarity scores will be similar for each video segment. Therefore, a variance of the similarity scores within an individual video segment may be used to identify a cost over the video segment. Additionally or alternatively, if a scene is constantly changing over time, the similarity scores will increase over time. Therefore, a cost function minimizing a linear change of similarity scores may be used.

The server(s) 112 may determine locations of the transition points 832 based on a number of transition points and the cost function. The number of transition points may be fixed for the video data 810 (received as an input or determined based on an average time per transition point), so the server(s) 112 may determine locations of each transition point 832 that reduces the overall cost. For example, grouping first video frames associated with video segment A separately from second video frames associated with video segment B reduces the overall cost relative to grouping the first video frames and the second video frames in a single video segment. The server(s) 112 may determine the location of the transition points 832 in the gaps 1-4 based on the cost associated with the individual video frames in the gaps 1-4.

FIG. 8B illustrates an example of identifying transition points according to embodiments of the present disclosure. As illustrated in FIG. 8B, the system 100 may identify transition points within the video data by grouping video frames based on a similarity score. For example, first video frames may be substantially similar while second video frames may be substantially similar, although the first video frames may be substantially different than the second video frames (e.g., a difference in similarity scores is above a threshold). The transition points may correspond to large changes in the video data, such as scene changes, movement, change in a number of faces detected or the like. In some examples, the system 100 may identify the transition points using low-level image features such as color histograms, spatial correlation or the like, although the present disclosure is not limited thereto.

The system 100 may use the transition points to identify scenes or other changes in the video data that may be used to determine a beginning or an end of a video section. For example, a series of video frames (e.g., video frames 1-100) may have a complexity metric above a threshold and the system 100 may therefore select the series of video frames. However, a first portion of the video frames (e.g., video frames 1-40) may be substantially similar (e.g., difference in similarity scores is above a threshold) but substantially different than a second portion of the video frames (e.g., video frames 41-100). The system 100 may determine a transition point between the first portion and the second portion (e.g., transition point at video frame 40) and may select the first portion as a first video section and the second portion as a second video section.

As illustrated in FIG. 8B, the system 100 may determine a similarity score between individual video frames of a portion of video data. For ease of explanation, FIG. 8B illustrates video frames 840 including discrete video frames (e.g., video frames 1-10), and the system 100 may determine a similarity score between each of the individual video frames. For example, the system 100 may determine a first similarity score between video frame 1 and video frame 2, a second similarity score between video frame 1 and video frame 3, a third similarity score between video frame 1 and video frame 4 and so on until the system 100 has determined a similarity score between every pair of video frames 840. The similarity scores may be determined using image features (e.g., color histograms) extracted from the video frames 840, spatial correlation, normalized cross-correlation (NCC) and/or motion vectors across the video frames 840. The similarity scores may be a numerical value between 0 and 1, with a similarity score of 0 indicating completely different video frames and a similarity score of 1 indicating identical video frames. In some examples, the similarity metric graph 820 may be a simplified version of the similarity matrix 850. For example, the similarity metric graph 820 may be a one-dimensional approximation corresponding to a diagonal line of the similarity matrix 850.

While the similarity scores are numerical values, FIG. 8B illustrates a similarity matrix 850 conceptually illustrating relative bands of similarity scores, with a darker color representing a higher similarity score. For example, an extremely high similarity score (e.g., 0.9 to 1.0) may be represented by a black square, a high similarity score (e.g., 0.75 to 0.9) may be represented by a dark grey square, a medium similarity score (e.g., 0.25 to 0.75) may be represented by a light grey square and a low similarity score (e.g., 0 to 0.25) may be represented by a white square. As illustrated in the similarity matrix 850, a black diagonal line runs from top left to bottom right, indicating that the video frames are identical to themselves (e.g., video frame 1 is identical to video frame 1, video frame 2 is identical to video frame 2, etc.).

Based on the similarity scores, the system 100 may separate the video frames 840 into several groups of video frames having similarity scores above a threshold. For example, video frames 2-4 are identical to each other and have a strong similarity to video frame 1, video frames 5-8 have a medium similarity, and video frame 9 has a strong similarity to video frame 10. Therefore, the system 100 may group the video frames 840 in various configurations based on a number of transition points for the video data. For example, in a first configuration the system 100 may group the video frames 840 as video frame 1, video frames 2-4, video frames 5-8 and video frames 9-10, corresponding to five transition points. In a second configuration, the system 100 may group the video frames 840 as video frames 1-4, video frames 5-8 and video frames 9-10, corresponding to four transition points. To determine the optimal number of transition points, the system 100 may generate a cost trellis 860.

To generate the cost trellis 860, the system 100 may determine a cost of introducing a transition point across the video frames 840. For example, the system 100 may determine a cost $w_{12}$ between video frame 1 and video frame 2, a cost $w_{13}$ between video frame 1 and video frame 3, a cost $w_{14}$ between video frame 1 and video frame 4 and so on until a cost $w_{910}$ between video frame 9 and video frame 10. The system 100 may determine the costs based on individual similarity scores in the similarity matrix 850. To determine the transition points, the system 100 may determine an optimal path between video frame 1 and video frame 10 in the cost trellis 860. For example, the system 100 may determine that a cost $w_{15}$ between video frame 1 and video frame 5 is lower than a cost $w_{16}$ between video frame 1 and video frame 6 as video frame 6 is not similar to video frames 1-4 (e.g., similarity score is below a threshold) but is similar to video frame 5 (e.g., similarity score is above the threshold).

To determine the optimal path, the system 100 may use an optimization algorithm to minimize an overall cost associated with the video frames 840. In some examples, the overall cost may be determined by summing individual costs from video frame 1 to video frame 10. As illustrated in FIG. 8B, for example, the optimized path 862 may include cost $w_{15}$ between video frame 1 and video frame 5, cost $w_{59}$ between video frame 5 and video frame 9 and cost $w_{910}$ between video frame 9 and video frame 10. Based on the optimized path 862, the system 100 may determine transition points 870, which include a first transition point at video frame 1 (beginning of the video data), a second transition point at video frame 5 (separating video frame 4 and video frame 5), a third transition point at video frame 9 (separating video frame 8 and video frame 9) and a fourth transition point at video frame 10 (end of the video data). Thus, the system 100 may group video frames 1-4, video frames 5-8 and video frames 9-10.

The system 100 may determine a total number of transition points based on a length of the video data, a size of the similarity matrix 850, a computational budget available on the system 100 or the like. If there were additional transition points available, the system 100 may determine an additional transition point at video frame 2 (separating video frame 1 and video frame 2) and/or video frame 9 (separating video frame 9 from video frame 10). However, the similarity score between video frames 1-2 and 9-10 are relatively high and the system 100 may simplify the optimized path 862 by removing the additional transition points.

FIG. 9 illustrates examples of determining portions of video data to select according to embodiments of the present disclosure. As illustrated in FIG. 9, the system 100 may determine first frame selection 910-1 indicating transition points (e.g., Transitions 1-4) in the video data. In some examples, the system 100 may identify transition points within the video clip by grouping video frames based on a similarity score. For example, first video frames preceding Transition 1 may be substantially similar while second video frames between Transition 1 and Transition 2 may be substantially similar, although the first video frames may be substantially different than the second video frames (e.g., a difference in similarity scores is above a threshold). The transition points may correspond to large changes in the video data, such as scene changes, movement, change in a number of faces detected or the like. In some examples, the system 100 may identify the transition points using low-level image features such as color histograms, spatial correlation or the like, although the present disclosure is not limited thereto.

FIG. 9 illustrates three techniques for selecting portions of the video data after determining the transitions, although the disclosure is not limited thereto. As illustrated in FIG. 9, the system 100 may select the portions of the video data using a first technique, which includes determining the transition points (e.g., the frame selection 910-1) and selecting an entirety of the video data (e.g., selected video data 920-1) along with the transition points. Additionally or alternatively, the system 100 may select the portions of the video data using a second technique, which includes determining the transition points and selecting a period of time surrounding each of the transition points. For example, the system 100 may determine frame selection 910-2 which includes a fixed period of time centered on each of the transition points (e.g., video clips A-D), and the selected video data 920-2 may include the selected portions of the video data (e.g., video clips A-D). As another example, the system 100 may select the portions of the video data to upload using a third technique, which includes determining the transition points, generating annotation data (e.g., performing computer vision processing) and selecting portions of the video data based on the annotation data. For example, video clip E includes Transition 1, video clip F includes Transitions 2-3, video clip G includes a portion of the video data that isn't associated with a transition and video clip H includes Transition 4. Therefore, the selected video data 920-3 may include the selected portions of the video data (e.g., video clips E-H) that have varying periods of time. While not illustrated in FIG. 9, the selected video data 920-3 may include a portion of the video data in space, as discussed below with regard to FIGS. 10B-10C.

FIGS. 10A-10C illustrate examples of selecting portions of video data in time and/or space according to embodiments of the present disclosure. As illustrated in FIG. 10A, the system 100 may select portions of the video data 1010 in time. For example, the selected video data 1020 may include an entire field of view of the video data 1010 (e.g., panoramic field of view or the like) for a portion of the overall time period, indicated by video clips A-E corresponding to unique periods of time within the video data 1010. While the selected video data 1020 is illustrated as being the same size as the video data 1010 (e.g., similar heights in a vertical dimension corresponding to size per second), the present disclosure is not limited thereto. For example, while the selected video data 1020 may include the entire field of view of the video data 1010, the selected video data 1020 may have a lower resolution than the video data 1010 to reduce a size of the selected video data 1020.

As illustrated in FIGS. 10B-10C, the system 100 may select portions of the video data 1010 in space. Thus, the video data 1010 may include a first field of view and the selected video data 1022/1024 may include a second field of view smaller than the first field of view. For example, a first resolution of the video data 1010 may include the full first field of view and include 5200 pixels in a horizontal direction (e.g., along the x axis) and 1080 pixels in a vertical direction (e.g., along the y axis), while a second resolution of the selected video data 1022/1024 may include a cropped second field of view and include 3200 pixels in the horizontal direction and 720 pixels in the vertical direction. The second field of view (e.g., second resolution) is not limited to a specific resolution and/or aspect ratio, however, and may be determined based on objects represented in the video data 1010. For example, motion data may be present in only a portion of the video data 1010 while the remainder of the video data 1010 is static, such as when the image capture device 110 is placed near a wall or other obstruction. Therefore, only the portion of the video data including the motion data may be selected by the system 100 to be included in the selected video data 1022/1024. However, the selected video data may be selected using a specific resolution and/or fixed aspect ratio without departing from the present disclosure. In addition to the selected video data 1022/1024 including the second field of view smaller than the first field of view, the selected video data 1022/1024 may decrease a resolution of the selected video data 1022/1024 relative to the video data 1010. For example, the video data 1010 may have a first pixel density (e.g., lines per inch) and the selected video data 1022/1024 may have a second pixel density smaller than the first pixel density.

In some examples, the server(s) 112 may generate a similarity matrix across subsections of video frames in order to select portions of the video data 1010 in space. Therefore, similar to the similarity matrix 850 described with regard to FIG. 8B, the server(s) 112 may divide the video data 1010 into subsections and may generate a similarity matrix for each subsection. However, the disclosure is not limited thereto and the server(s) 112 may determine the similarity matrix using an entirety of the video frame.

FIG. 10B illustrates the selected video data 1022 selecting portions of the video data 1010 using a fixed framing window. For example, the image capture device 110 may be positioned near a wall or other obstruction and the video data 1010 may include static portions with no activity/movement or the like for the entirety of the video data 1010. Using the fixed framing window, the image capture device 110 may crop the video data 1010 to the selected video data 1022 uniformly to remove the static portions of the video data 1010.

In contrast to the fixed framing window illustrated in FIG. 10B, FIG. 10C illustrates the selected video data 1024 selecting portions of the video data 1010 using a dynamic framing window. Thus, the video data 1010 may correspond to a first field of view including dynamic objects/motion or the like but the selected video data 1024 may be selected to include only a portion of the first field of view. For example, the image capture device 110 may perform computer vision processing to identify objects of interest, motion or the like and may vary the dynamic framing window. Thus, the selected video data 1024 may include a second field of view based on the objects represented in the video data 1010. As illustrated in FIG. 10C, the second field of view may correspond to selected video data 1024-1 for a first video frame 1012-1, selected video data 1024-2 for a second video frame 1012-2 and selected video data 1024-3 for a third video frame 1012-3. However, the second field of view is not limited to a specific resolution and/or aspect ratio and may include additional portions of the video data 1010 to allow the server(s) 112 room to crop/pan/zoom within the selected video data 1024 when selecting a fixed aspect ratio.

While FIG. 10A illustrates the system 100 selecting portions of the video data 1010 in time and FIGS. 10B-10C illustrates the system 100 selecting portions of the video data 1010 in space, the system 100 may select portions of the video data 1010 in time and space. For example, the selected video data may include portions of the video data 1010 in time (e.g., video clips corresponding to a period of time) and space (e.g., a portion of the panoramic field of view). In some examples, the system 100 may determine the portion of the panoramic field of view to include for individual video clips. For example, a first video clip (e.g., beginning at a 1 minute mark of the video data 1010) may include the entire panoramic field of view, a second video clip (e.g., beginning at a 5 minute mark in the video data 1010) may include a fixed field of view within the panoramic field of view and a third video clip (e.g., beginning at a 10 minute mark in the video data 1010) may include a dynamic field of view within the panoramic field of view.

FIG. 11 illustrates a frame selection output according to embodiments of the present disclosure. As illustrated in FIG. 11, the frame selection 1110 may include a location of transition points 1120 and a number of transition points 1122. For example, the location of transition points 1120 may indicate a first transition at a first location (e.g., first video frame), a second transition at a second location (e.g., second video frame), a third transition at a third location (e.g., third video frame) and a fourth transition at a fourth location (e.g., fourth video frame), and the number of transition points 1122 may indicate that there are four transition points.

In addition, the frame selection 1110 may include a location of portions 1130 and a number of portions 1132. For example, the location of portions 1130 may indicate a first portion (e.g., portion A) between a fifth location and a sixth location (e.g., fifth video frame and a sixth video frame) including the first location, a second portion (e.g., portion B) between a seventh location and an eight location (e.g., seventh video frame and an eighth video frame) including the second location and the third location, a third portion (e.g., portion C) between a ninth location and a tenth location (e.g., ninth video frame and a tenth video frame) and a fourth portion (e.g., portion D) between an eleventh location and a twelfth location (e.g., eleventh video frame and a twelfth video frame). The number of portions 1132 may indicate that there are four portions (e.g., portions A-D).

Figure 12:
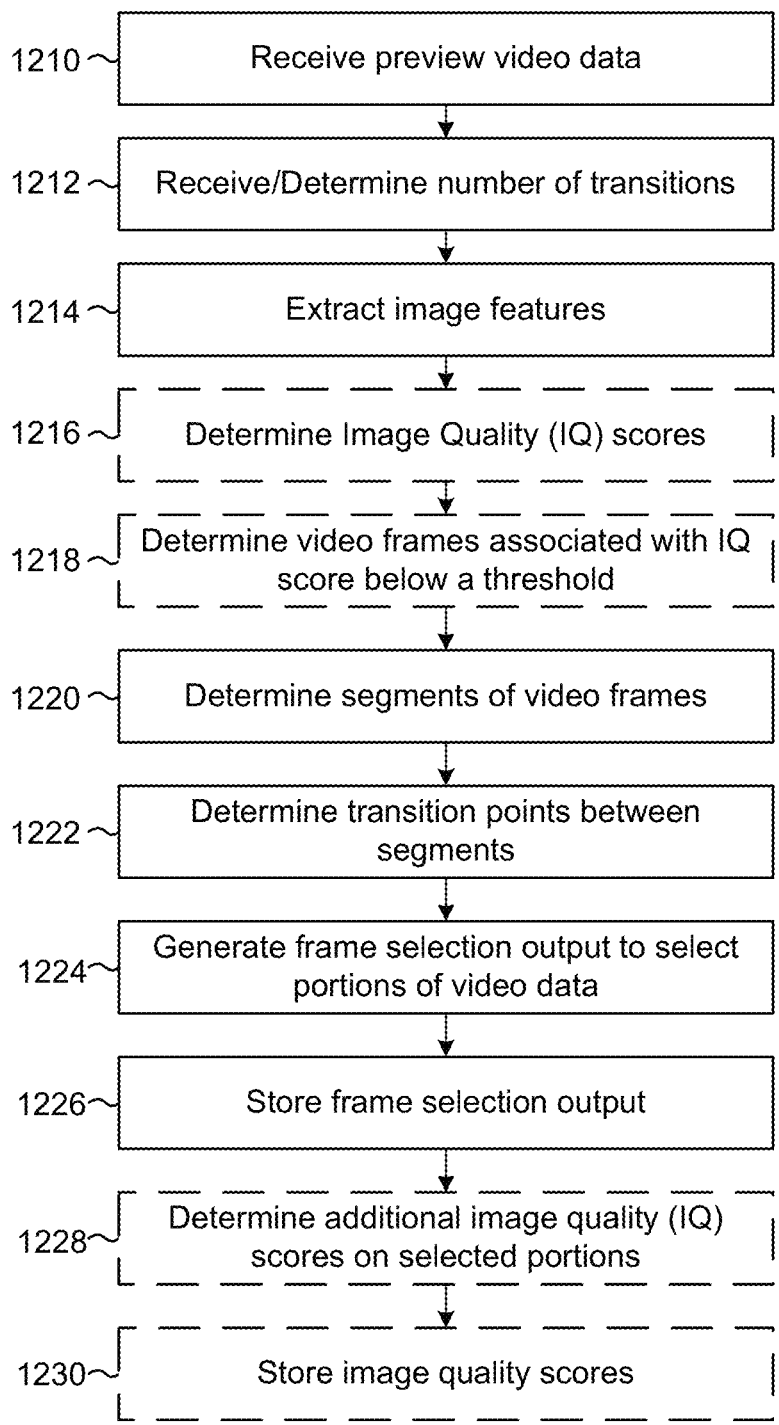
FIG. 12 is a flowchart conceptually illustrating an example method for generating frame selection output according to embodiments of the present disclosure.

FIG. 12 is a flowchart conceptually illustrating an example method for generating frame selection output according to embodiments of the present disclosure. As illustrated in FIG. 12, the server(s) 112 may receive (1210) preview video data and may receive/determine (1212) a number of transitions. In some examples, the server(s) 112 may receive the number of transitions as an input. In other examples, the server(s) 112 may determine a duration of the preview video data and may divide the duration by an average time per transition point to determine the number of transition points associated with the preview video data. The average time per transition point may be stored in the server(s) 112 and may be determined based on past history, for example based on similar videos to the preview video data.

The server(s) 112 may extract (1214) image features from the preview video data, such as color histograms or the like. The server(s) 112 may optionally determine (1216) image quality (IQ) scores associated with individual video frames using the image features and may optionally determine (1218) video frames associated with an IQ score below a threshold. In some examples, the video frames associated with an IQ score below the threshold may be discarded. However, determining the IQ scores may be computationally intensive, as each individual video frame must be analyzed individually, and therefore the disclosure is not limited thereto. Additionally or alternatively, steps 1216-1218 may be performed on portions of the video data included in the frame selection output after step 1224.

The server(s) 112 may determine (1220) segments of video frames based on the image features, excluding the discarded video frames. For example, a series of similar video frames may have a similarity score within a range and the server(s) 112 may group the series of video frames in a segment. The server(s) 112 may determine (1222) transition points between the segments, generate (1224) frame selection output to select portions of the video data and may store (1226) the frame selection output to an annotation database. For example, the server(s) 112 may select portions of the video data based on the image features and the transition points, the frame selection output indicating the selected portions of the video data and the transition points. In some examples, the server(s) 112 may annotate the selected portions of the video data, reducing a processing burden on the server(s) 112 relative to annotating an entirety of the video data. In other examples, the server(s) 112 may send a request to the image capture device 110 to upload only the selected portions of the video data, reducing a bandwidth consumption and/or processing burden on the image capture device 110 and/or the server(s) 112 relative to uploading an entirety of the video data.

Optionally, the server(s) 112 may determine (1228) additional image quality (IQ) scores for individual video frames included in the selected portions of the video data and may store (1230) the image quality scores to the annotation database. In some examples, the server(s) 112 may determine first IQ scores in step 1216 and may store the first IQ scores to the annotation database without performing step 1228. In other examples, the server(s) 112 may determine second IQ scores using more advanced processing and/or different image features in step 1228, such that the second IQ scores are different from the first IQ scores, and may store the second IQ scores to the annotation database.

Figure 13:
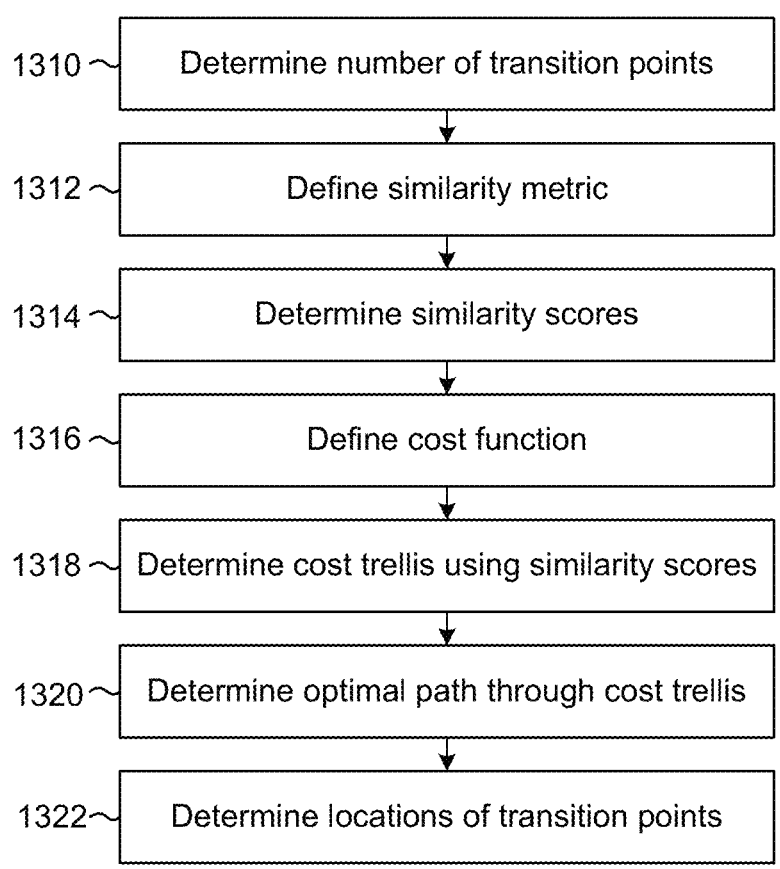
FIG. 13 is a flowchart conceptually illustrating an example method for determining locations of transition points according to embodiments of the present disclosure.

FIG. 13 is a flowchart conceptually illustrating an example method for determining locations of transition points according to embodiments of the present disclosure. As illustrated in FIG. 13, the server(s) 112 may determine (1310) a number of transition points with which to separate the video frames. For example, the server(s) 112 may determine a total number of transition points based on a length of the video data, a number of similarity scores, a computational budget available to the server(s) 112 or the like.

The server(s) 112 may define (1312) a similarity metric. For example, the similarity metric may be defined using multiple techniques, such as a similarity in image features (e.g., color histograms), a similarity in spatial correlation across video frames, a similarity in normalized cross-correlation (NCC) across video frames, a similarity between motion vectors across video frames or the like. In some examples, the server(s) 112 may determine the motion vectors based on an encoding process, as subsequent video frames may be encoded with reference to a reference video frame and may therefore include motion vectors. The server(s) 112 may determine (1314) similarity scores associated with pairs of video frames. For example, a first similarity score may indicate a similarity between a first video frame and a second video frame and a second similarity score may indicate a similarity between the first video frame and a third video frame.

The server(s) 112 may define (1316) a cost function indicating a cost associated with each of the similarity scores in order to perform global cost optimization using dynamic programming to minimize the overall transition cost. Thus, the server(s) 112 may determine a current overall transition costs at any point by adding a new transition cost to a previous overall transition cost (e.g., sum of transition costs associated with previous transition points). The server(s) 112 may define the cost function based on similarity scores from typical videos based on the image features or other data associated with the video data. For example, if the image capture device 110 is stationary while capturing the video data and the video segments include similar frames, similarity scores will be similar for each video segment. Therefore, a variance of the similarity scores within an individual video segment may be used to identify a cost over the video segment. Additionally or alternatively, if a scene is constantly changing over time, the similarity scores will increase over time. Therefore, a cost function minimizing a linear change of similarity scores may be used.

The server(s) 112 may determine (1318) a cost trellis using the similarity scores and the defined cost function. The cost trellis may include a number of transition costs corresponding to inserting transition points at particular video frames. For example, a first transition cost may be associated with the first similarity score and may indicate a cost associated with inserting a transition point between the first video frame and the second video frame. Similarly, a second transition cost may be associated with the second similarity score and may indicate a cost associated with inserting a transition point between the second video frame and the third video frame (e.g., grouping the first video frame and the second video frame together).

The server(s) 112 may determine (1320) an optimal path through the cost trellis to minimize an overall transition cost and may determine (1322) locations of transition points based on the optimal path. Thus, the server(s) 112 may determine optimal locations for each of the number of transition points so that the overall transition cost is minimized or near a minimum value. For example, if the server(s) 112 determines to insert 100 transition points, the server(s) 112 may determine first locations for the transition points, grouping together video frames associated with similarity scores/transition costs above a first threshold. However, if the server(s) 112 determines to insert 120 transition points, the server(s) 112 may determine second locations for the transition points, grouping together video frames associated with similarity scores/transition costs above a second threshold that is lower than the first threshold. Therefore, the first locations may group video frames together that have relatively high similarity scores/transition costs whereas the second locations may group video frames together that have extremely high similarity scores/transition costs.

Figure 14:
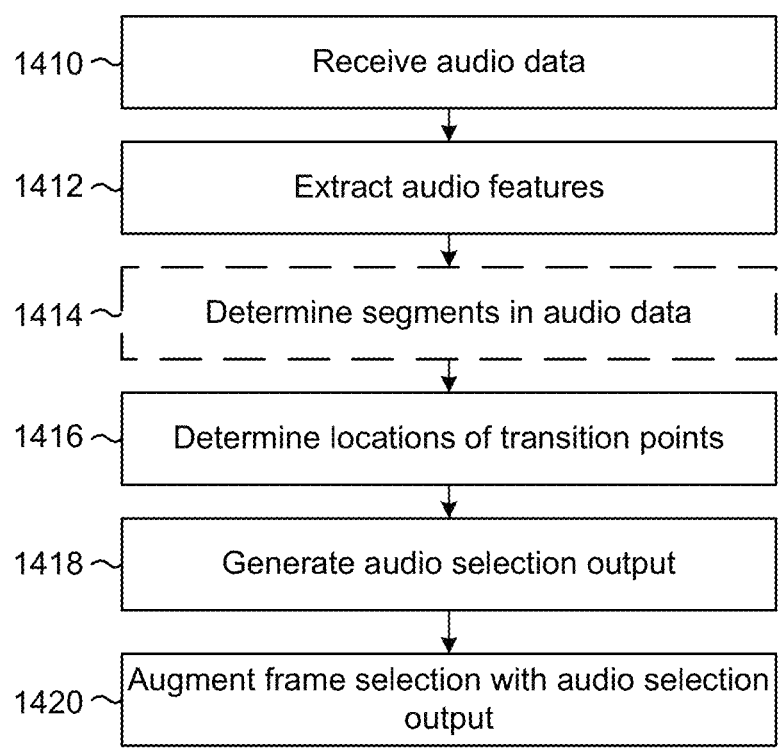
FIG. 14 is a flowchart conceptually illustrating an example method for generating an audio selection output according to embodiments of the present disclosure.

FIG. 14 is a flowchart conceptually illustrating an example method for generating an audio selection output according to embodiments of the present disclosure. As illustrated in FIG. 14, the server(s) 112 may receive (1410) audio data corresponding to the preview video data and may extract (1412) audio features from the audio data. For example, the server(s) 112 may identify audio cues included in the audio data, such as a particular noise, clapping, laughter, the existence of speech or the like. The server(s) 112 may optionally determine (1414) segments in the audio data based on the audio features, may determine (1416) locations of transition points based on the audio features and/or segments and may generate (1418) an audio selection output including the segments and/or transition points. In some examples, the server(s) 112 may be unable to determine the segments in the audio data from the audio features, but may be able to determine the locations of the transition points.

The audio selection output may be used to augment the frame selection process, providing additional input that the server(s) 112 may use to determine transition points in the video data. For example, the server(s) 112 may combine the audio selection output with the similarity matrix to determine the transition points. Additionally or alternatively, the server(s) 112 may determine first transition points using the similarity matrix and determine second transition points using the audio selection output and merge the first transition points and the second transition points.

Figure 15:
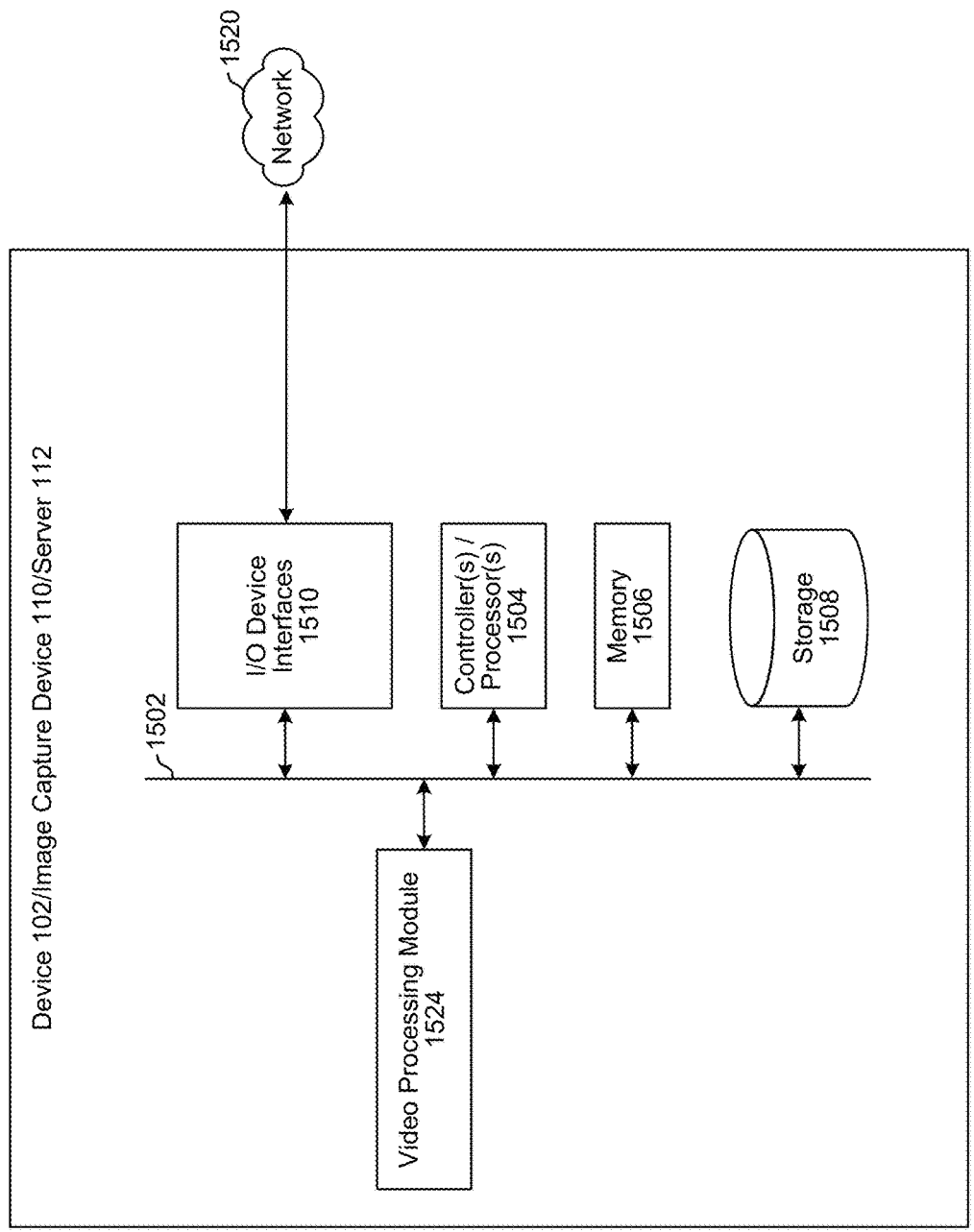
FIG. 15 is a block diagram conceptually illustrating example components of a system according to embodiments of the present disclosure.

FIG. 15 illustrates a block diagram conceptually illustrating example components of a system 100 including one or more of a device 102, an image capture device 110 and/or a server(s) 112. Depending upon how the system is structured, some of the components illustrated in FIG. 15 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1508 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 15, the device 102/image capture device 110/server(s) 112 may include an address/data bus 1502 for conveying data among components of the device 102/image capture device 110/server(s) 112. Each component within the device 102/image capture device 110/server(s) 112 may also be directly connected to other components in addition to (or instead of) being connected to other components across the bus 1502.

The device 102/image capture device 110/server(s) 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/image capture device 110/server(s) 112 may also include a data storage component 1508 for storing data and processor-executable instructions. The data storage component 1508 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1510.

The device 102/image capture device 110/server(s) 112 includes input/output device interfaces 1510. A variety of components may be connected to the device 102/image capture device 110/server(s) 112 through the input/output device interfaces 1510, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 1510 may be configured to operate with a network 1520, for example a wireless local area network (WLAN) (such as WiFi), Bluetooth, ZigBee and/or wireless networks, such as a Long Term Evolution (LTE) network, WiMAX network, 3G network, etc. The network 1520 may include a local or private network or may include a wide network such as the internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a video processing module 1524, which may comprise processor-executable instructions stored in storage 1508 to be executed by controller(s)/processor(s) 1504 (e.g., software, firmware), hardware, or some combination thereof. For example, components of the video processing module 1524 may be part of a software application running in the foreground and/or background on the device 102/image capture device 110/server(s) 112. The video processing module 1524 may control the device 102/image capture device 110/server(s) 112 as discussed above, for example with regard to FIGS. 1, 12, 13 and/or 14. Some or all of the controllers/modules of the video processing module 1524 may be executable instructions that may be embedded in hardware or firmware in addition to, or instead of, software. In one embodiment, the device 102/image capture device 110/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the device(s) 102/image capture device 110/server(s) 112, as illustrated in FIG. 15, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 16:
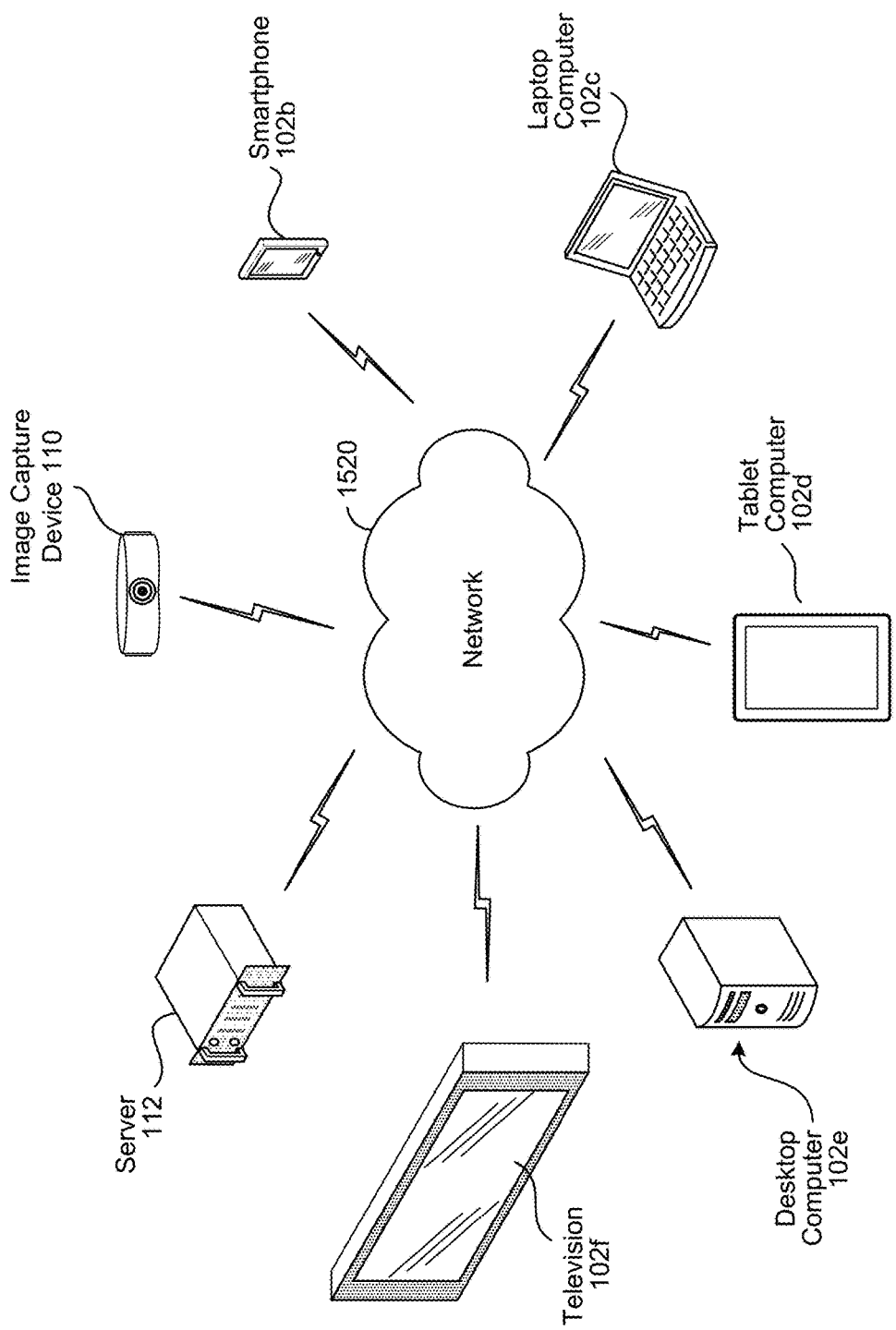
FIG. 16 illustrates an example of a computer network for use with the system.

As shown in FIG. 16, multiple devices may be connected over a network 1520. The network 1520 may include a local or private network or may include a wide network such as the internet. Devices may be connected to the network 1520 through either wired or wireless connections. For example, a smart phone 102b may be connected to the network 1520 through a wireless service provider. Other devices, such as an image capture device 110, laptop computer 102c, tablet computer 102d, desktop computer 102e, television 102f, and/or server(s) 112, may connect to the network 1520 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 12, 13 and/or 14. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for selecting portions of video data, the method comprising:
receiving sampled video data associated with first video data that has a first frame rate of 30 frames per second, wherein the sampled video data has a second frame rate of 1 frame per second;
determining a plurality of color histograms, a first color histogram corresponding to a first video frame in the sampled video data;
determining, using the plurality of color histograms, a plurality of similarity scores, including:
determining a first similarity score by comparing the first color histogram associated with the first video frame to a second color histogram associated with a second video frame in the sampled video data, and
determining a second similarity score by comparing the first color histogram to a third color histogram associated with a third video frame in the sampled video data;
determining that a first group of similarity scores of the plurality of similarity scores are within a first range;
determining a first series of contiguous video frames corresponding to the first group of similarity scores;
determining that a second group of similarity scores of the plurality of similarity scores are within a second range;
determining a second series of contiguous video frames corresponding to the second group of similarity scores, the second series beginning with a fourth video frame in the sampled video data;
determining a plurality of transition points in the sampled video data, including determining a first transition point that corresponds to an intersection between the first series and the second series by determining that a third similarity score, which corresponds to a similarity between the first video frame and the fourth video frame, is below a threshold;
selecting portions of the sampled video data using the plurality of transition points and the plurality of color histograms, wherein a first portion of the portions extends from the first video frame to a fifth video frame in the sampled video data and includes the first transition point;
generating a frame selection output that indicates the portions of the sampled video data and the plurality of transition points, wherein the frame selection output includes:
a first identification that corresponds to the first video frame and is associated with a beginning of the first portion,
a second identification that corresponds to the fifth video frame and is associated with an ending of the first portion, and
a third identification that corresponds to the fourth video frame and is associated with the first transition point; and
generating annotation data corresponding to the portions of the sampled video data, the annotation data indicating first characteristics associated with the first video frame.

2. The computer-implemented method of claim 1, further comprising:
determining a similarity matrix including the plurality of similarity scores, wherein:
a first row and a first column of the similarity matrix is associated with the first video frame,
a second row and a second column of the similarity matrix is associated with the second video frame,
the first similarity score is included in a first element at the first row and the second column, and
the second similarity score is included in a second element at the first row and a third column;
determining that the first similarity score is above a threshold;
determining that the second similarity score is above the threshold;
determining that the third similarity score is below the threshold;
determining that the first group of similarity scores comprises the first similarity score and the second similarity score;
determining that the first series of contiguous video frames includes the first video frame, the second video frame and the third video frame;
determining that a fourth similarity score is above the threshold, the fourth similarity score corresponding to a similarity between the fourth video frame and a fifth video frame in the sampled video data;

determining that a fifth similarity score is above the threshold, the fifth similarity score corresponding to a similarity between the fourth video frame and a sixth video frame in the sampled video data;

determining that a sixth similarity score is below the threshold, the sixth similarity score corresponding to a similarity between the fourth video frame and a seventh video frame in the sampled video data;

determining that the second group of similarity scores comprises the fourth similarity score and the fifth similarity score; and determining that the second series of contiguous video frames includes the fourth video frame, the fifth video frame and the sixth video frame.

3. The computer-implemented method of claim 1, further comprising:

determining transition costs associated with the plurality of similarity scores, including a first transition cost corresponding to the first similarity score;

determining a first cost of the first series by determining a variance of the first group of similarity scores associated with the first series;

determining a second cost of the second series by determining a variance of the second group of similarity scores associated with the second series;

determining a first combined cost by adding the first cost and the second cost;

determining a third series of contiguous video frames following the second series;

determining a third cost of the third series; and determining a second combined cost by adding the third cost and the first combined cost.

4. The computer-implemented method of claim 1, further comprising:

receiving audio data associated with the sampled video data;

determining audio cues in the audio data, the audio cues associated with at least one of speech, applause or laughter and including a first audio cue;

determining a second plurality of transition points in the audio data, wherein a second transition point of the second plurality of transition points corresponds to the first audio cue; and determining the plurality of transition points using the second plurality of transition points.

5. A computer-implemented method, comprising:

receiving sampled video data associated with first video data that has a first frame rate, wherein the sampled video data has a second frame rate lower than the first frame rate;

determining a plurality of image features, wherein a first image feature of the plurality of image features corresponds to a first video frame in the sampled video data;

determining transition points in the sample video data using the plurality of image features, wherein a first transition point of the transition points corresponds to an end of a first series of contiguous video frames and a beginning of a second series of contiguous video frames, and determining the transition points further comprises:

determining, based on the plurality of image features, a first similarity score that corresponds to a first similarity between the first video frame and a second video frame in the sampled video data, determining, based on the plurality of image features, a second similarity score that corresponds to a second similarity between the first video frame and a third video frame in the sampled video data, determining that the first similarity score is above a threshold, determining that the second similarity score is above the threshold, and determining that the first series of contiguous video frames includes at least the first video frame, the second video frame and the third video frame;

selecting a first portion of the sampled video data based on the first transition point; and generating a frame selection output that indicates the first portion.

6. The computer-implemented method of claim 5, wherein determining the transition points further comprises:

determining, based on the plurality of image features, a third similarity score that corresponds to a third similarity between the first video frame and a fourth video frame in the sampled video data;

determining that the third similarity score is below the threshold; and determining that the second series of contiguous video frames includes at least the fourth video frame.

7. The computer-implemented method of claim 5, further comprising:

determining, based on the plurality of image features, a third similarity score that corresponds to a third similarity between the first video frame and a fourth video frame in the sampled video data;

determining a first transition cost associated with the first similarity score;

determining a second transition cost associated with the second similarity score;

determining a third transition cost associated with the third similarity score;

determining that the first transition cost is above a second threshold;

determining that the second transition cost is above the second threshold;

determining that the third transition cost is below the second threshold;

determining that the first series of contiguous video frames includes at least the first video frame, the second video frame and the third video frame; and determining that the second series of contiguous video frames includes at least the fourth video frame.

8. The computer-implemented method of claim 5, further comprising:

determining, based on the plurality of image features, a third similarity score that corresponds to a third similarity between the first video frame and a fourth video frame in the sampled video data;

determining, based on the plurality of image features, a fourth similarity score that corresponds to a fourth similarity between the second video frame and the third video frame;

determining a first transition cost associated with the first similarity score;

determining a second transition cost associated with the second similarity score;

determining a third transition cost associated with the third similarity score;

determining a fourth transition cost associated with the fourth similarity score;

determining that the first transition cost is above a second threshold;

determining that the second transition cost is above the second threshold;
determining that the third transition cost is below the second threshold;
determining that the second series of contiguous video frames includes at least the fourth video frame;
determining that the first transition cost is below a third threshold;
determining that the fourth transition cost is above the third threshold;
determining that a third series of contiguous video frames includes at least the first video frame; and
determining that the first series of contiguous video frames includes at least the second video frame and the third video frame.

9. The computer-implemented method of claim 5, further comprising:
determining a first cost associated with the first series;
determining a second cost associated with the second series;
determining a first combined cost by adding the first cost and the second cost;
determining a third series of contiguous video frames following the second series;
determining a third cost associated with the third series; and
determining a second combined cost by adding the third cost and the first combined cost.

10. The computer-implemented method of claim 5, further comprising:
determining first pixel coordinates that have pixel values within a first range;
determining that the pixel values are within the first range for a period of time exceeding a second threshold;
determining a region of interest in the sampled video data that corresponds to second pixel coordinates excluding at least a portion of the first pixel coordinates; and
selecting the portions of the sampled video data corresponding to the region of interest.

11. The computer-implemented method of claim 5, further comprising:
determining that the first video frame is included in the first portion;
determining a second image feature that corresponds to the first video frame;
determining, based on the second image feature, a first image quality score that corresponds to the first video frame; and
storing the first image quality score in an annotation database.

12. The computer-implemented method of claim 5, further comprising
receiving audio data associated with the sampled video data;
determining audio features of the audio data, the audio features identifying an existence of audio cues in the audio data;
determining, based on the audio features, second transition points in the audio data, including determining a second transition point of the second transition points that corresponds to an audio cue; and
determining the transition point based on the second transition points.

13. A device, comprising:
at least one processor;
a memory device including instructions operable to be executed by the at least one processor to configure the device to:
receive sampled video data associated with first video data that has a first frame rate, wherein the sampled video data has a second frame rate lower than the first frame rate;
determine a plurality of image features, wherein a first image feature of the plurality of image features corresponds to a first video frame in the sampled video data;
determine transition points in the sample video data using the plurality of image features, wherein a first transition point of the transition points corresponds to an end of a first series of contiguous video frames and a beginning of a second series of contiguous video frames;
determine first pixel coordinates that have pixel values within a first range;
determine that the pixel values are within the first range for a period of time exceeding a threshold;
determine a region of interest in the sampled video data that corresponds to second pixel coordinates excluding at least a portion of the first pixel coordinates;
select a first portion of the sampled video data based on the first transition point the first portion corresponding to the region of interest; and
generate a frame selection output that indicates the first portion.

14. The system of claim 13, wherein the instructions further configure the system to:
determine, based on the plurality of image features, a first similarity score that corresponds to a first similarity between the first video frame and a second video frame in the sampled video data;
determine, based on the plurality of image features, a second similarity score that corresponds to a second similarity between the first video frame and a third video frame in the sampled video data;
determine, based on the plurality of image features, a third similarity score that corresponds to a third similarity between the first video frame and a fourth video frame in the sampled video data;
determine that the first similarity score is above a second threshold;
determine that the second similarity score is above the second threshold;
determine that the third similarity score is below the second threshold;
determine that the first series of contiguous video frames includes at least the first video frame, the second video frame and the third video frame; and
determine that the second series of contiguous video frames includes at least the fourth video frame.

15. The system of claim 13, wherein the instructions further configure the system to:
determine, based on the plurality of image features, a first similarity score that corresponds to a first similarity between the first video frame and a second video frame in the sampled video data;
determine, based on the plurality of image features, a second similarity score that corresponds to a second similarity between the first video frame and a third video frame in the sampled video data;
determine, based on the plurality of image features, a third similarity score that corresponds to a third similarity between the first video frame and a fourth video frame in the sampled video data;
determine a first transition cost associated with the first similarity score;

determine a second transition cost associated with the second similarity score;
determine a third transition cost associated with the third similarity score;
determine that the first transition cost is above a second threshold;
determine that the second transition cost is above the second threshold;
determine that the third transition cost is below the second threshold;
determine that the first series of contiguous video frames includes at least the first video frame, the second video frame and the third video frame; and
determine that the second series of contiguous video frames includes at least the fourth video frame.

16. The system of claim 13, wherein the instructions further configure the system to:
determine, based on the plurality of image features, a first similarity score that corresponds to a first similarity between the first video frame and a second video frame in the sampled video data;
determine, based on the plurality of image features, a second similarity score that corresponds to a second similarity between the first video frame and a third video frame in the sampled video data;
determine, based on the plurality of image features, a third similarity score that corresponds to a third similarity between the first video frame and a fourth video frame in the sampled video data;
determine, based on the plurality of image features, a fourth similarity score that corresponds to a fourth similarity between the second video frame and the third video frame;
determine a first transition cost associated with the first similarity score;
determine a second transition cost associated with the second similarity score;
determine a third transition cost associated with the third similarity score;
determine a fourth transition cost associated with the fourth similarity score;
determine that the first transition cost is above a second threshold;
determine that the second transition cost is above the second threshold;
determine that the third transition cost is below the second threshold;
determine that the second series of contiguous video frames includes at least the fourth video frame;
determine that the first transition cost is below a third threshold;
determine that the fourth transition cost is above the third threshold;
determine that a third series of contiguous video frames includes at least the first video frame; and
determine that the first series of contiguous video frames includes at least the second video frame and the third video frame.

17. The system of claim 13, wherein the instructions further configure the system to:
determine a first cost associated with the first series;
determine a second cost associated with the second series;
determine a first combined cost by adding the first cost and the second cost;
determine a third series of contiguous video frames following the second series;
determine a third cost associated with the third series; and
determine a second combined cost by adding the third cost and the first combined cost.

18. The system of claim 13, wherein the instructions further configure the system to:
determine that the first video frame is included in the first portion;
determine a second image feature that corresponds to the first video frame;
determine, based on the second image feature, a first image quality score that corresponds to the first video frame; and
store the first image quality score in an annotation database.

19. The system of claim 13, wherein the instructions further configure the system to:
receive audio data associated with the sampled video data;
determine audio features of the audio data, the audio features identifying an existence of audio cues in the audio data;
determine, based on the audio features, second transition points in the audio data, including determining a second transition point of the second transition points that corresponds to an audio cue; and
determine the transition point based on the second transition point.

20. A computer-implemented method, comprising:
receiving sampled video data associated with first video data that has a first frame rate, wherein the sampled video data has a second frame rate lower than the first frame rate;
determining a plurality of image features, wherein a first image feature of the plurality of image features corresponds to a first video frame in the sampled video data;
receiving audio data associated with the sampled video data;
determining audio features of the audio data, the audio features identifying an existence of audio cues in the audio data;
determining, based on the audio features, first transition points in the audio data, including determining a first transition point of the first transition points that corresponds to an audio cue;
determining, based on the first transition points, second transition points in the sample video data using the plurality of image features, wherein a second transition point of the second transition points corresponds to an end of a first series of contiguous video frames and a beginning of a second series of contiguous video frames;
selecting a first portion of the sampled video data based on the second transition point; and
generating a frame selection output that indicates the first portion.

* * * * *